United States Patent
Ohshita

Patent Number: 5,900,988
Date of Patent: May 4, 1999

[54] VIEWFINDER HAVING A HIGH MAGNIFICATION RATIO

[75] Inventor: Koichi Ohshita, Tokyo, Japan

[73] Assignee: Nikon Corporation, Tokyo, Japan

[21] Appl. No.: 08/944,761

[22] Filed: Oct. 6, 1997

[30] Foreign Application Priority Data

Oct. 4, 1996 [JP] Japan .................................. 8-283046

[51] Int. Cl.$^6$ .............. G02B 15/14; G02B 23/00
[52] U.S. Cl. ............................... 359/676; 359/432
[58] Field of Search ............... 359/676, 683–689, 359/422, 424, 432, 754–756, 784

[56] References Cited

U.S. PATENT DOCUMENTS

| | | | |
|---|---|---|---|
| 5,712,727 | 1/1998 | Mouri | 359/431 |
| 5,784,204 | 7/1998 | Kang | 359/686 |
| 5,815,312 | 9/1998 | Takato | 359/431 |

FOREIGN PATENT DOCUMENTS

| | | | |
|---|---|---|---|
| 3-233420 | 10/1991 | Japan | G02B 13/18 |
| 6-242377 | 9/1994 | Japan | G02B 15/16 |

*Primary Examiner*—Georgia Epps
*Assistant Examiner*—Jordan M. Schwartz
*Attorney, Agent, or Firm*—Chapman and Cutler

[57] ABSTRACT

A viewfinder having a high magnification ratio permits satisfactory correction of aberration in spite of its compact and simple structure. An objective lens group of the viewfinder includes a first lens unit having negative refractive power, a second lens unit having positive refractive power, and a third lens unit having negative refractive power and varies magnification by moving at least the second lens unit. Moreover, the first lens unit includes at least one negative lens, the second lens unit includes at least two positive lenses, and the third lens unit includes at least one negative lens. Furthermore, the positive lens is formed so that an object-side surface is aspherical and a predetermined condition is satisfied.

20 Claims, 28 Drawing Sheets

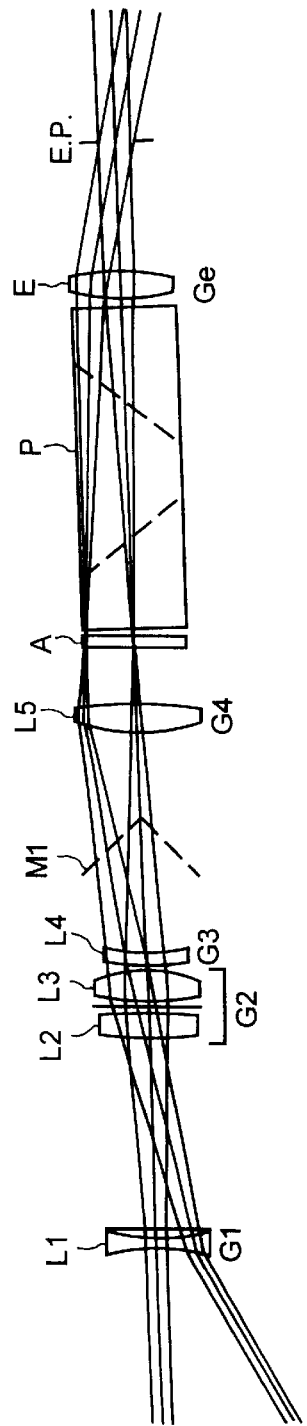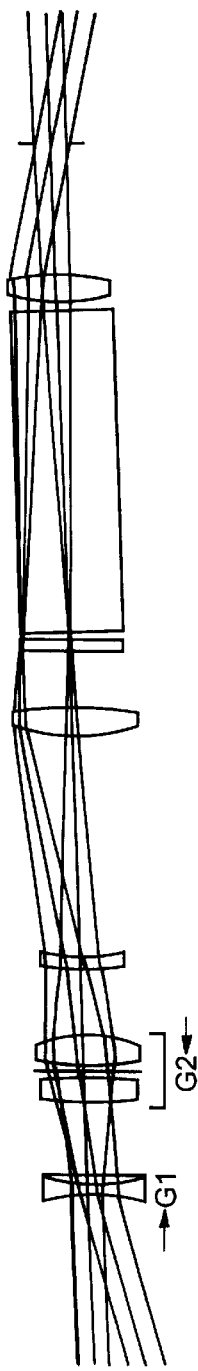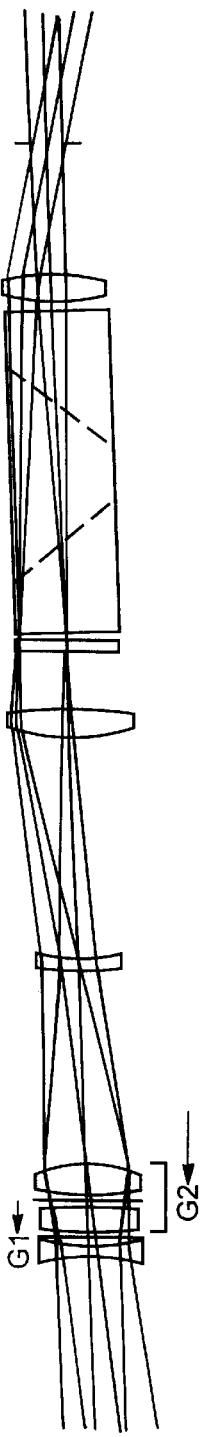

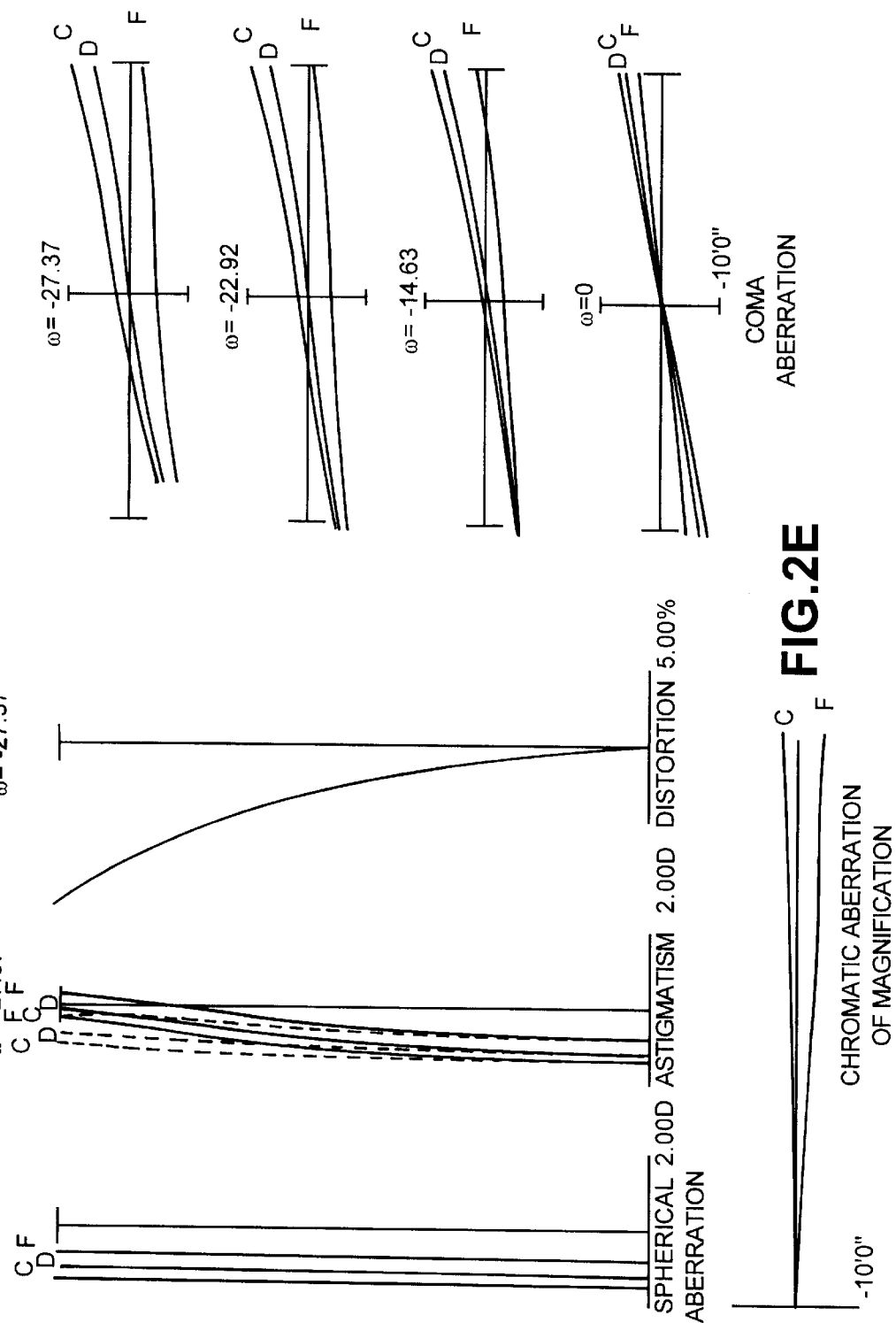

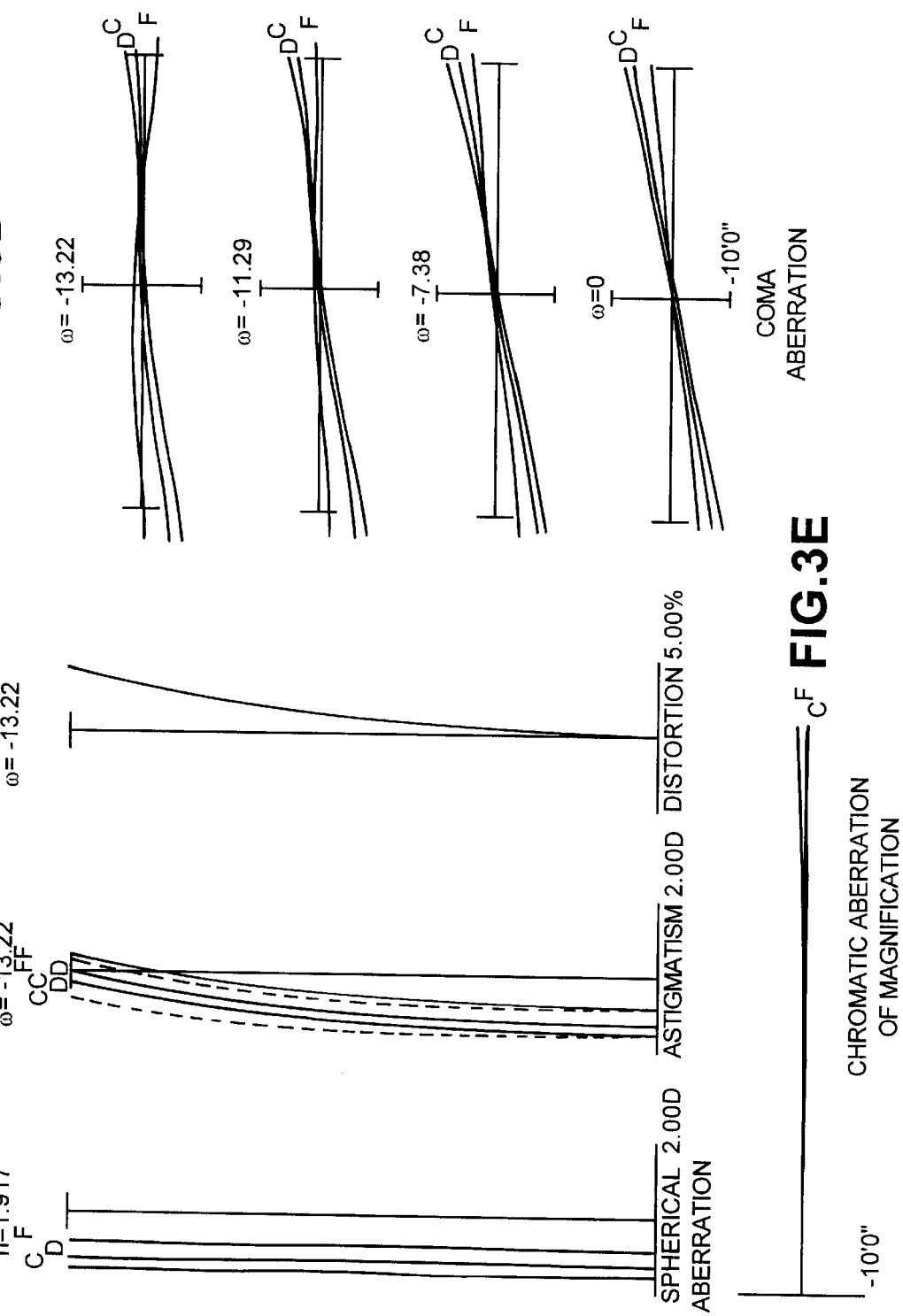

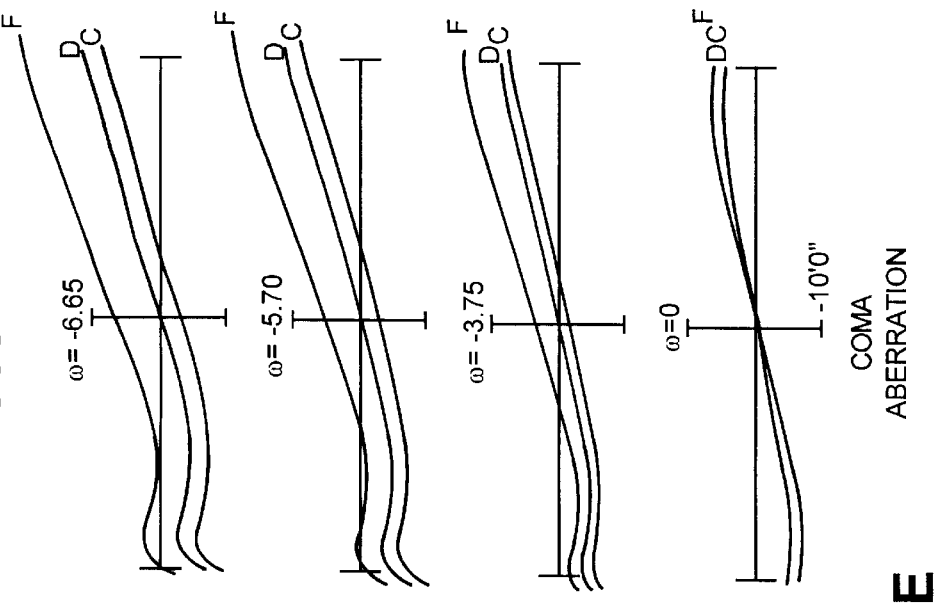
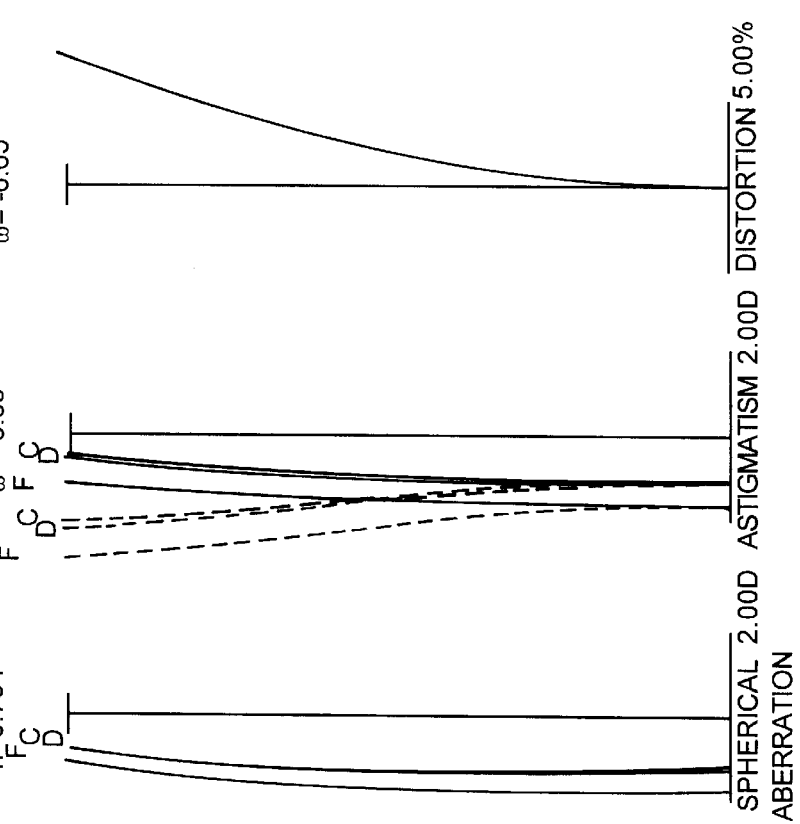
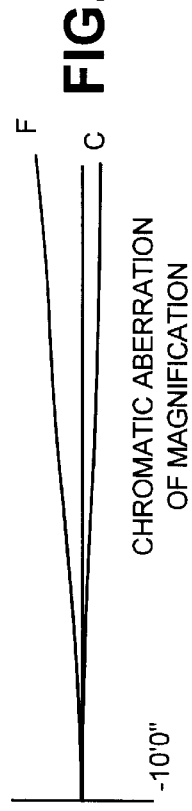

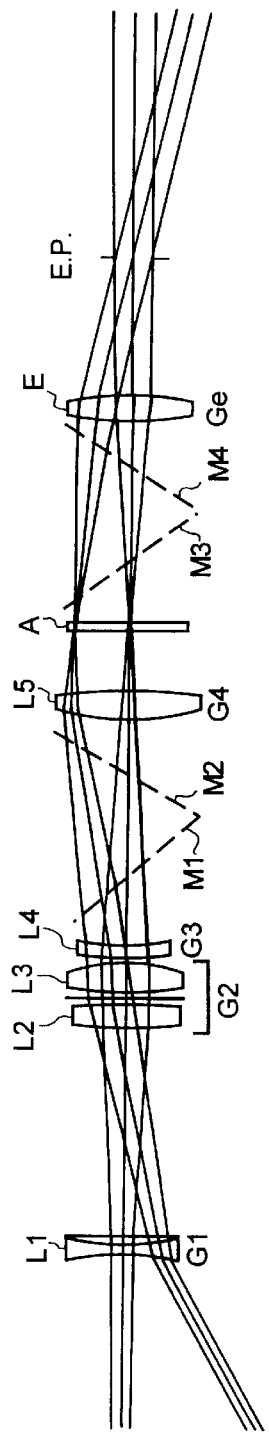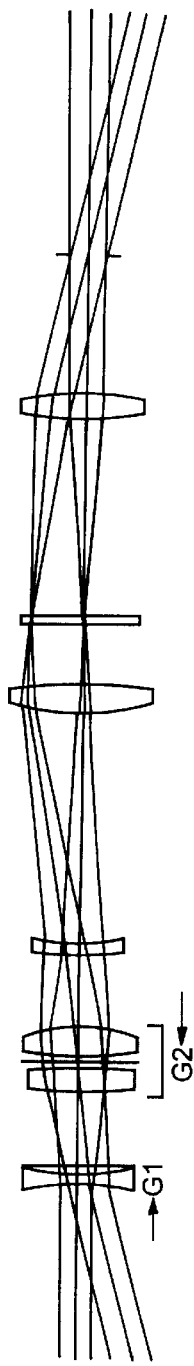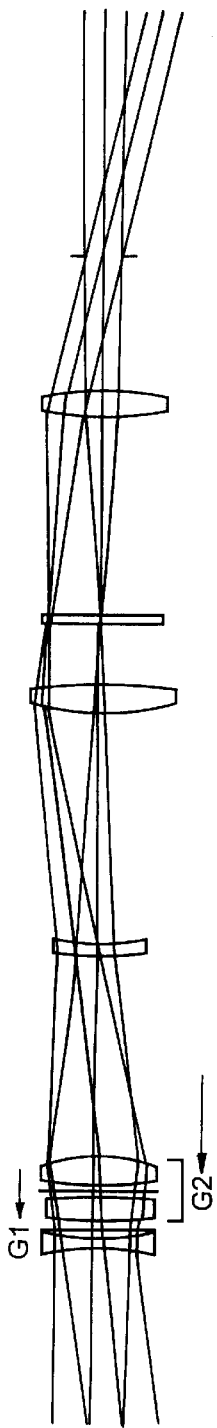

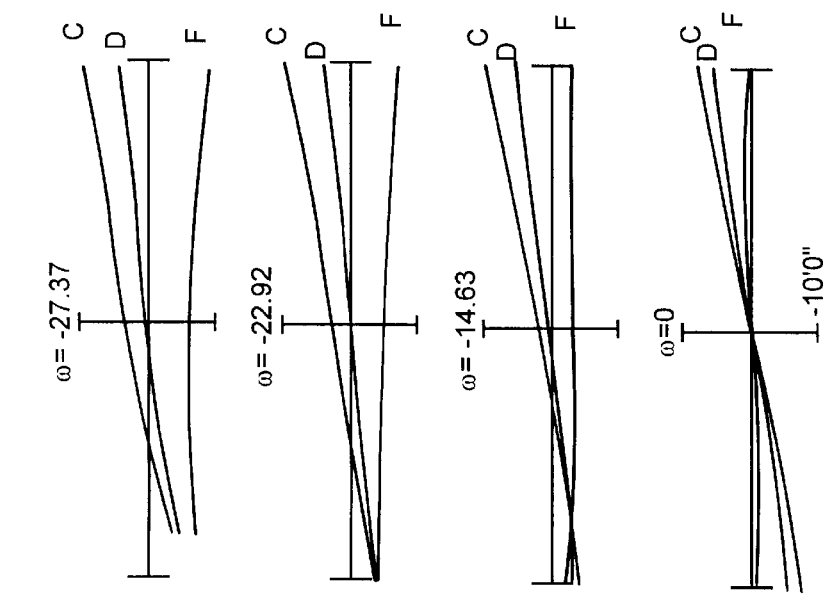
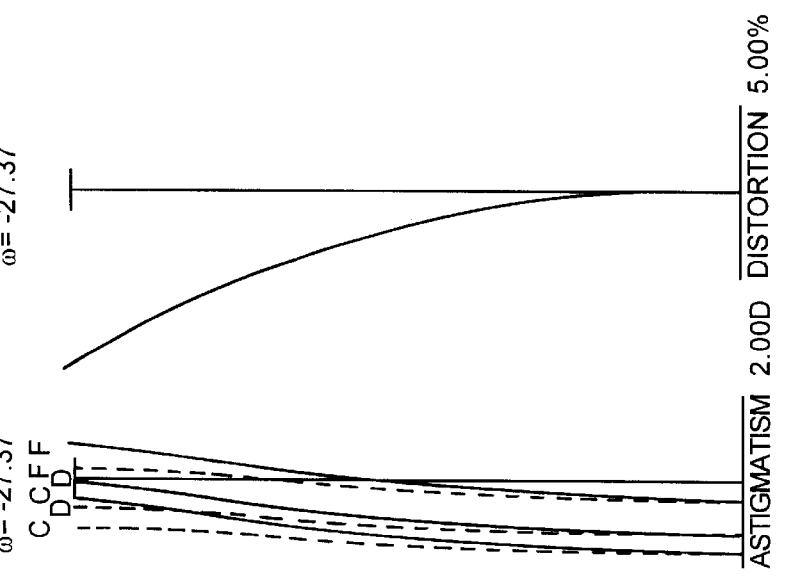
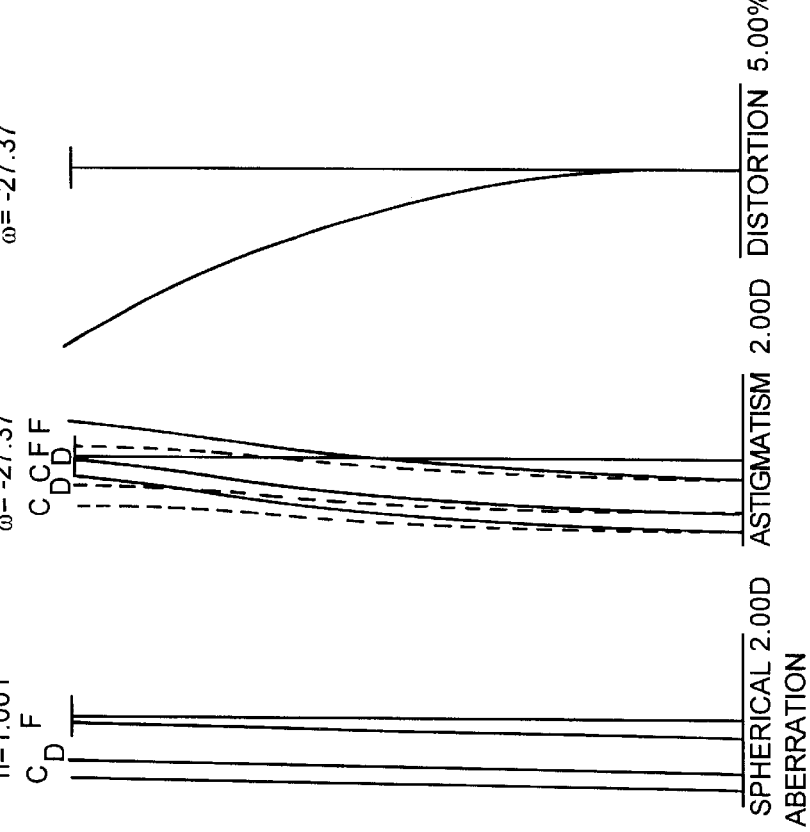

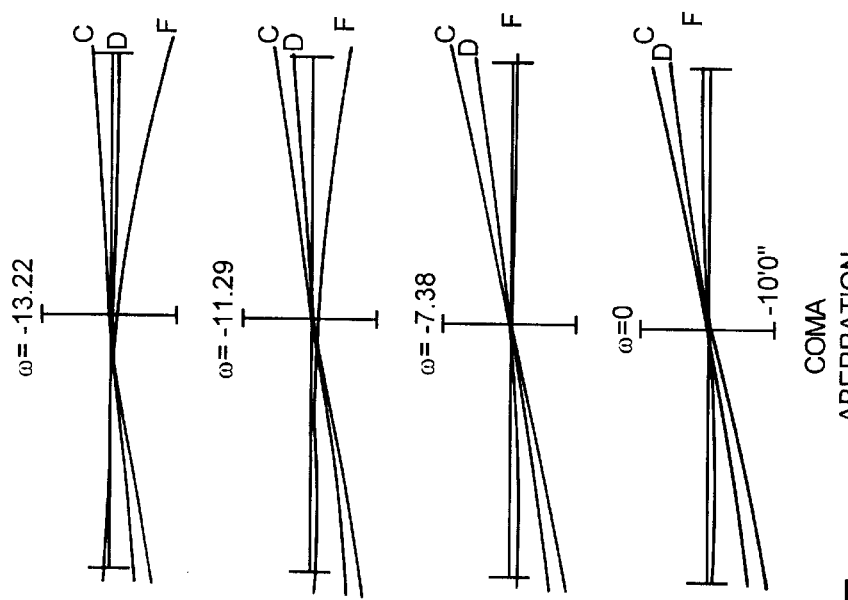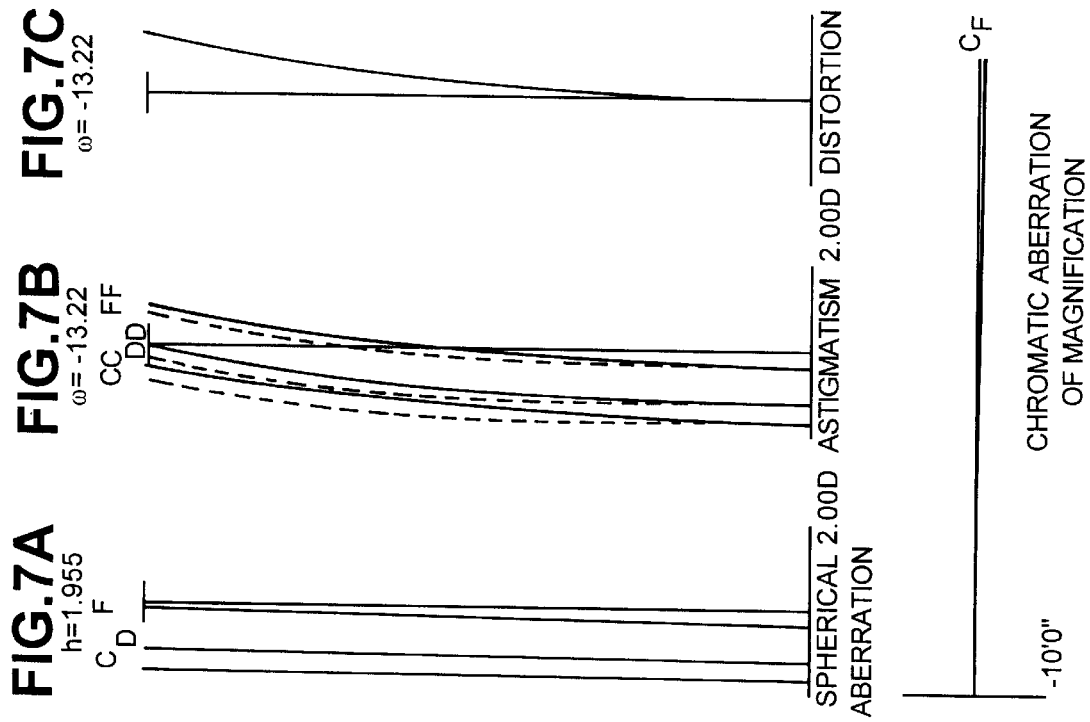

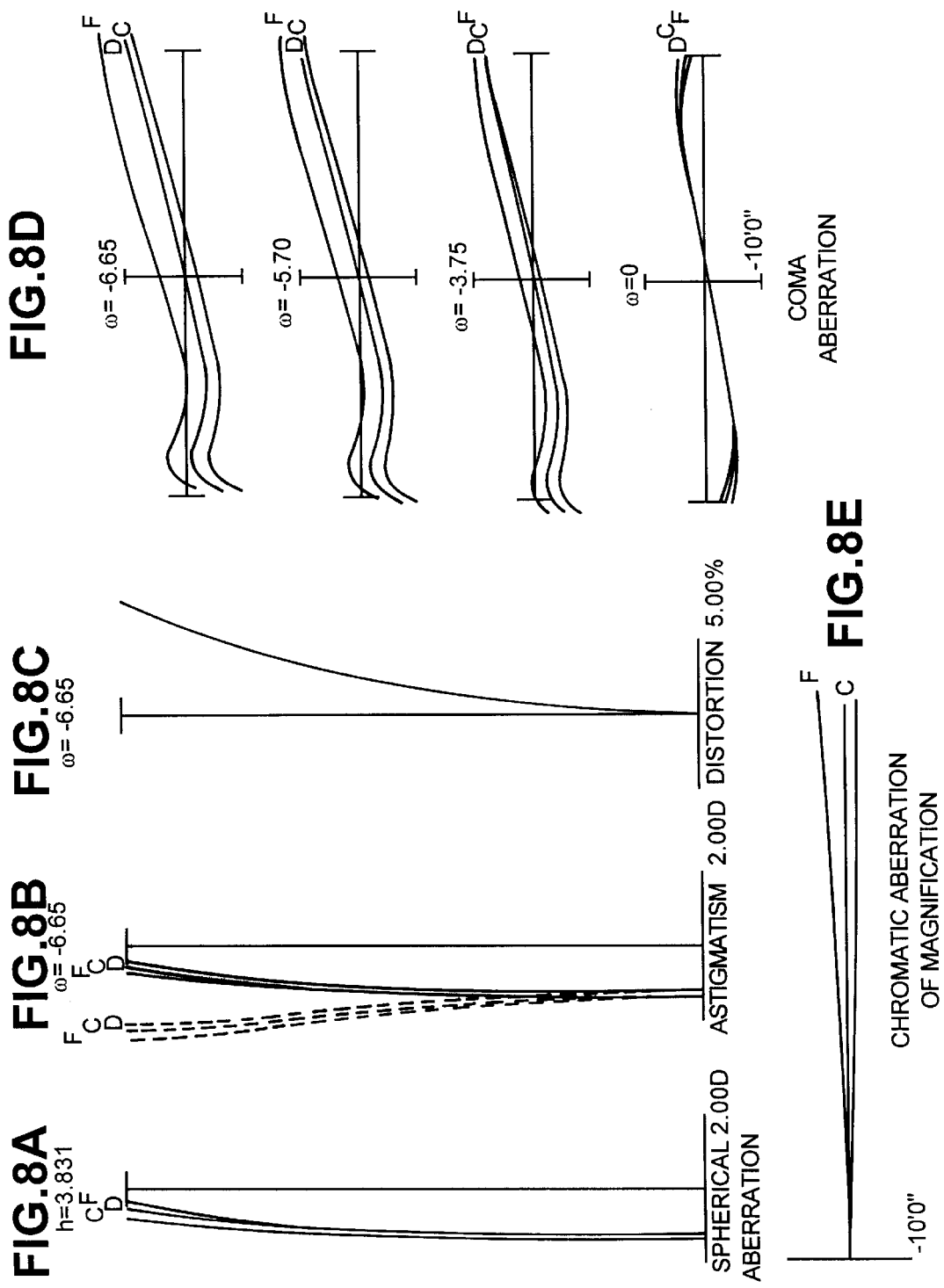

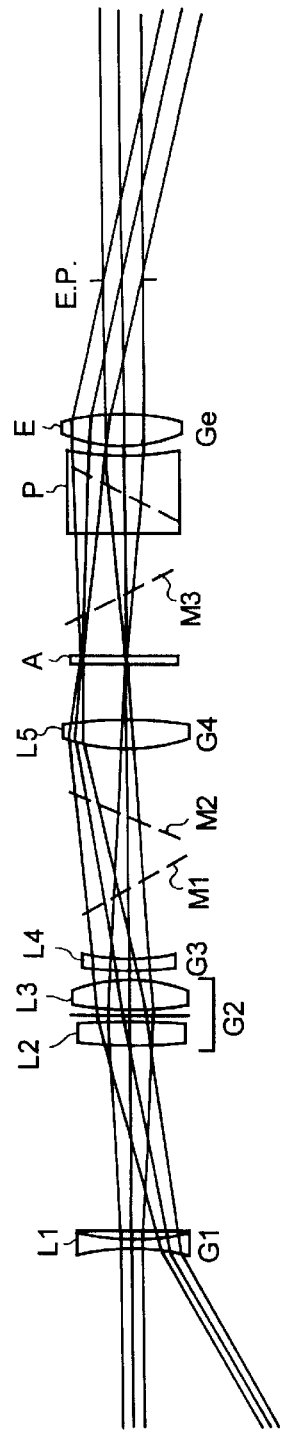
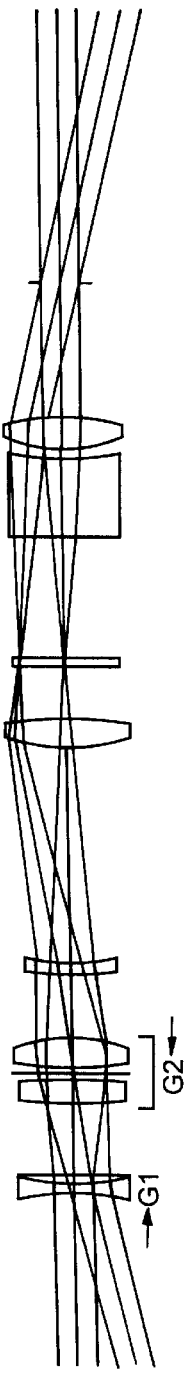
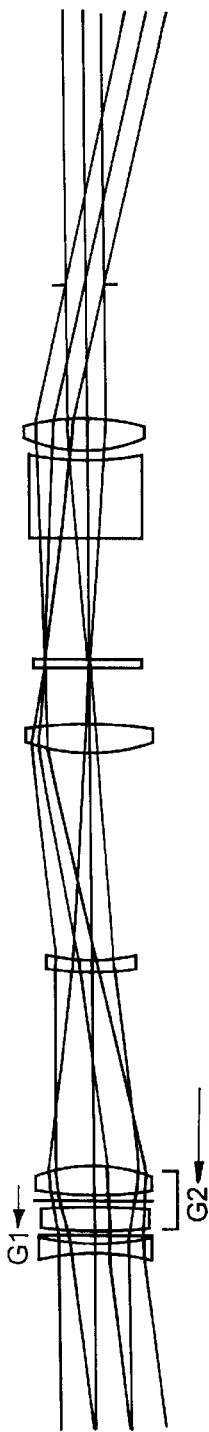

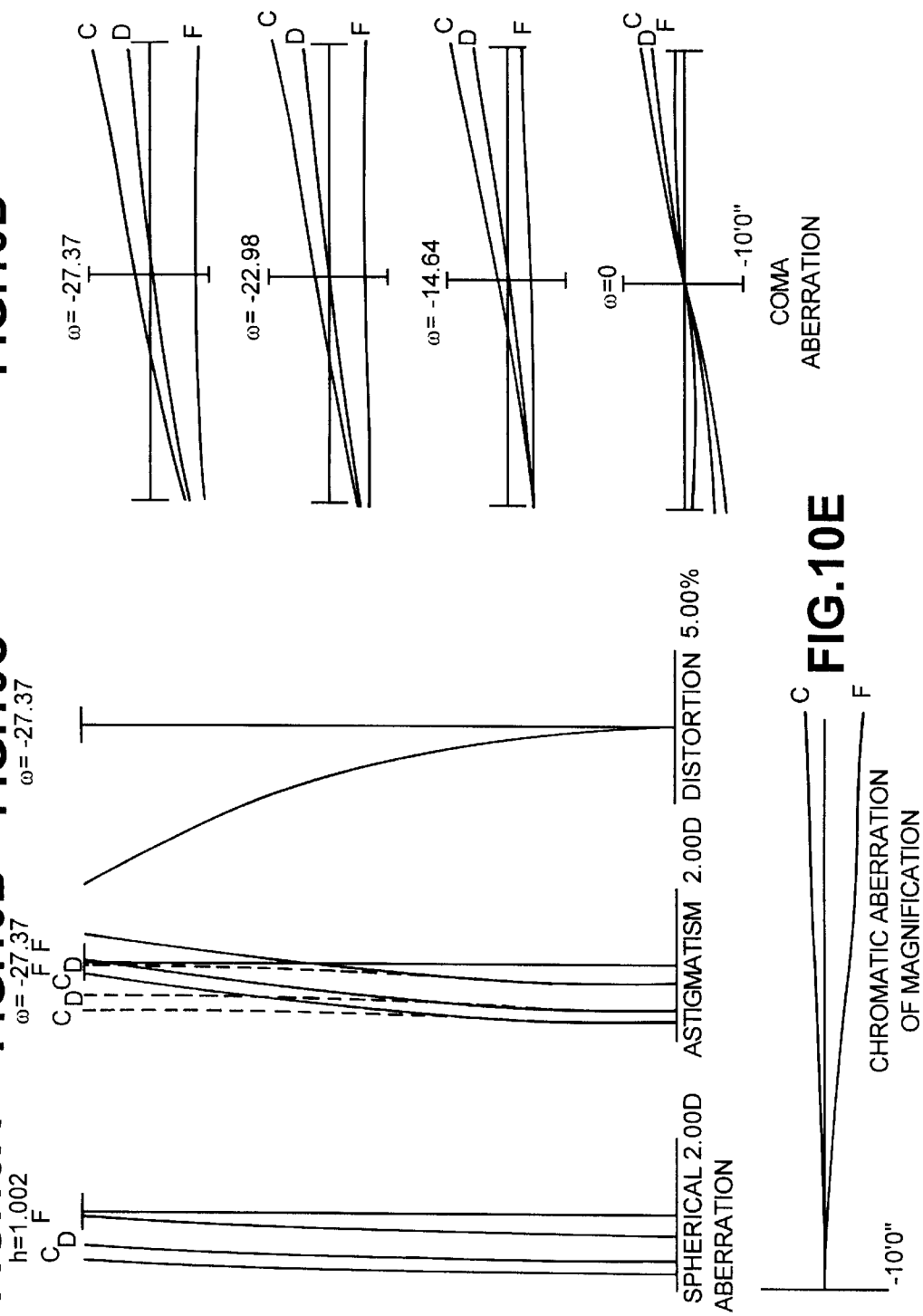

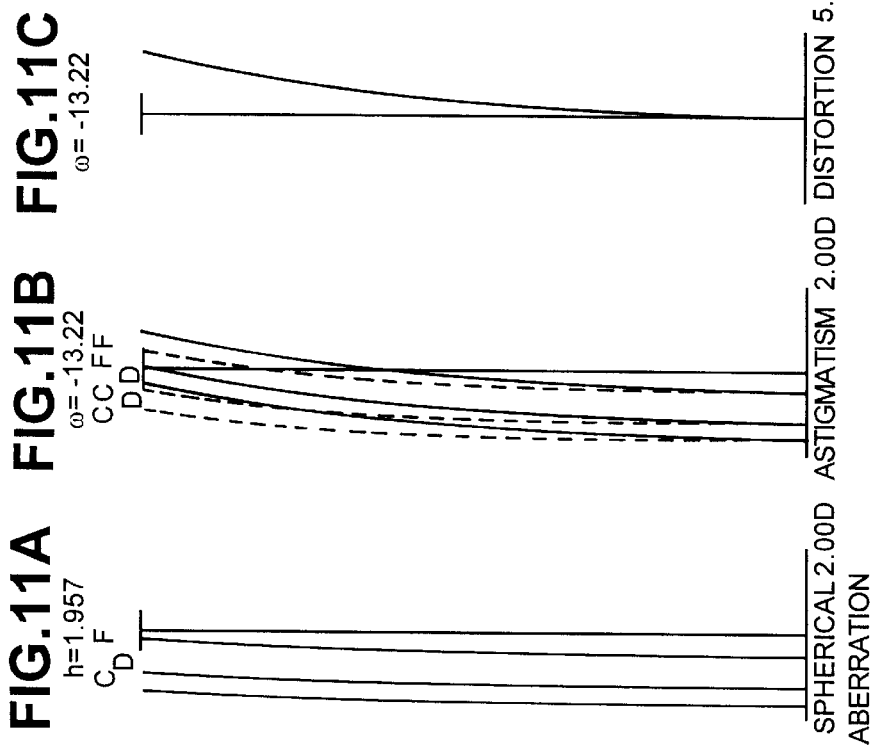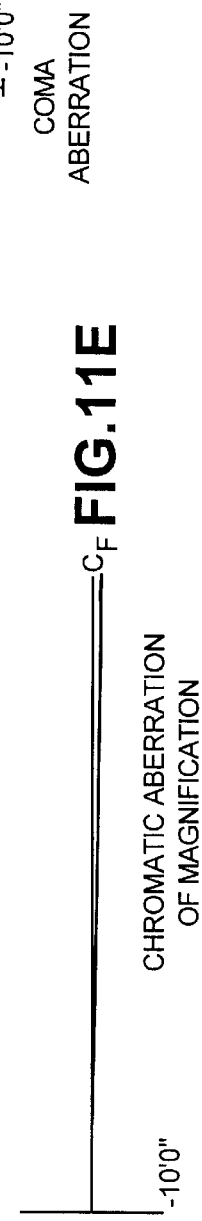

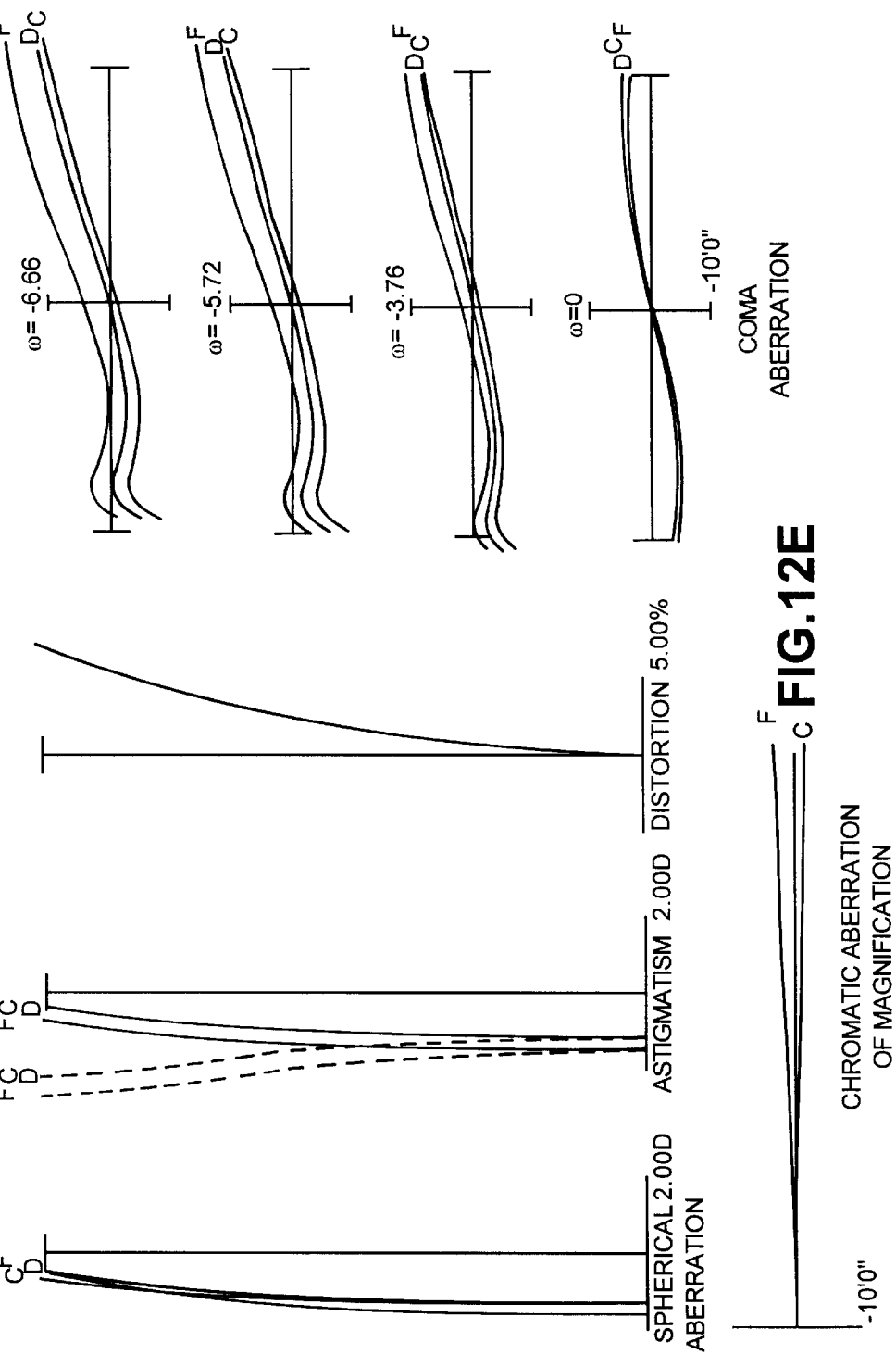

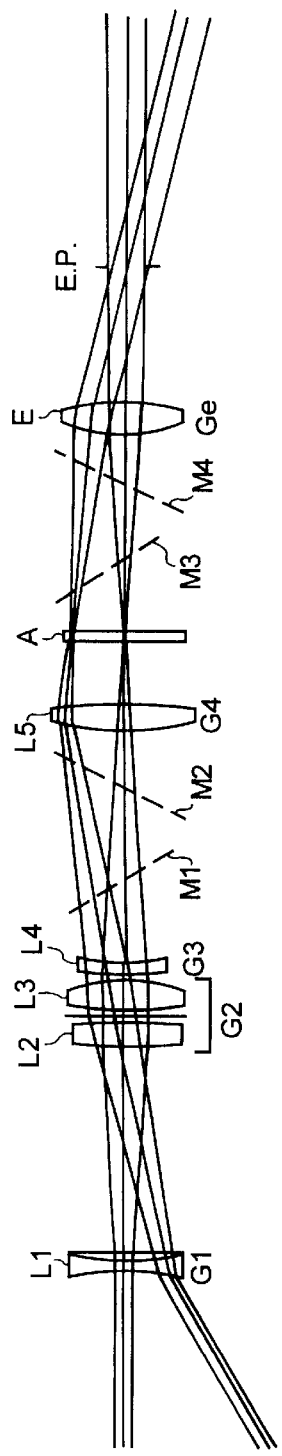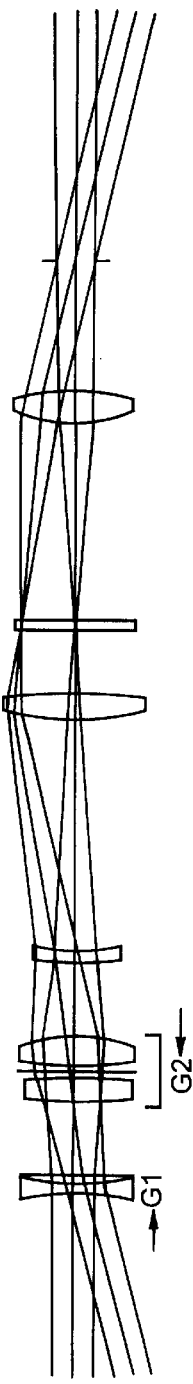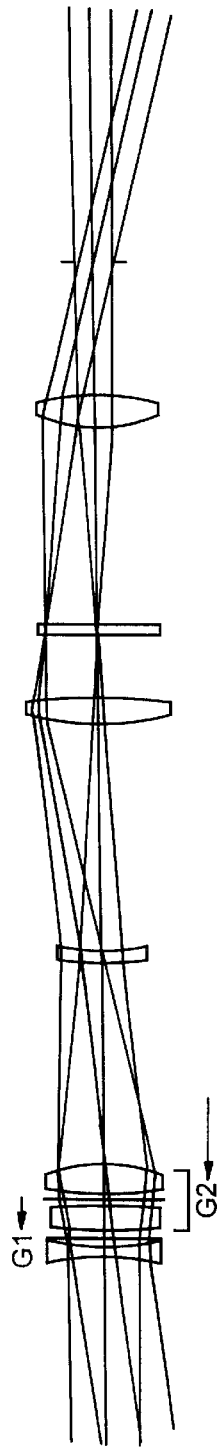

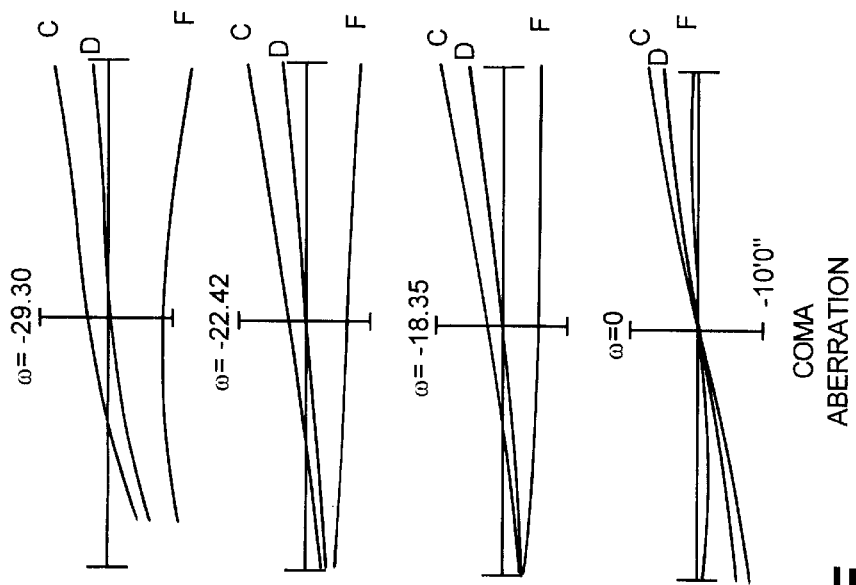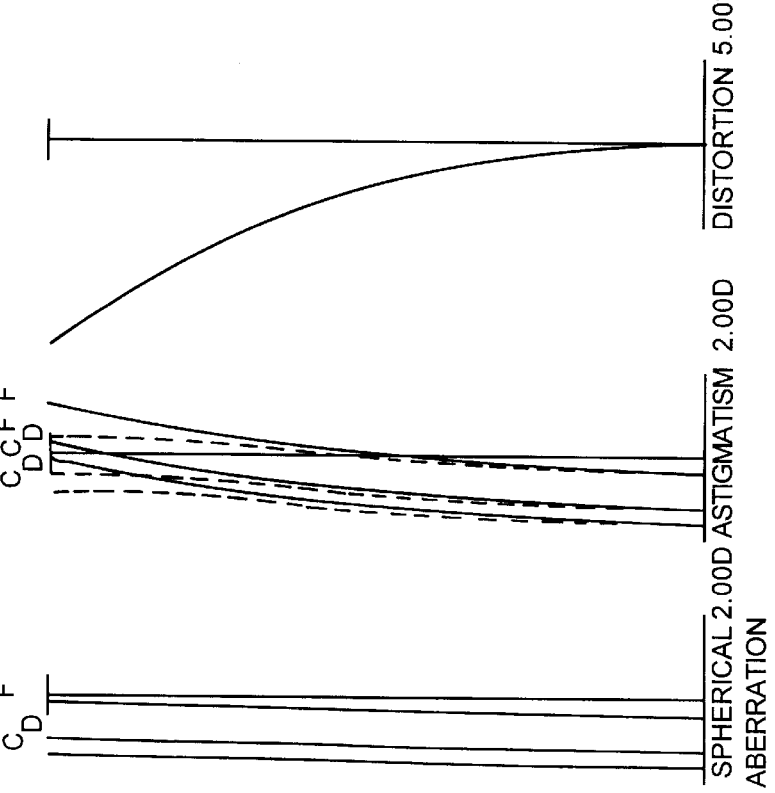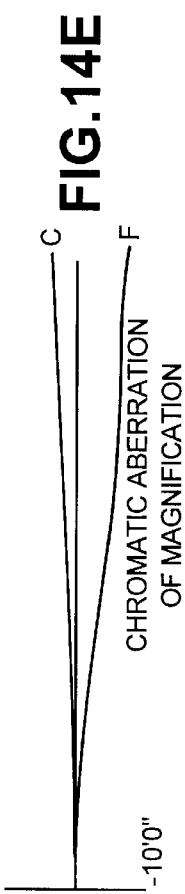

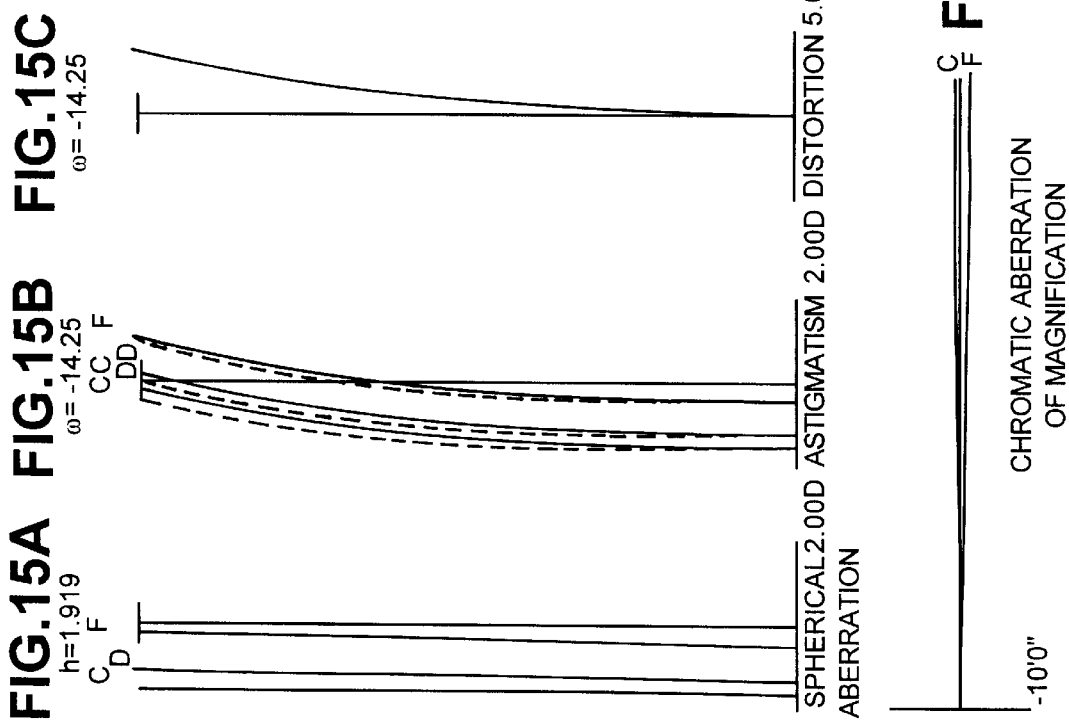

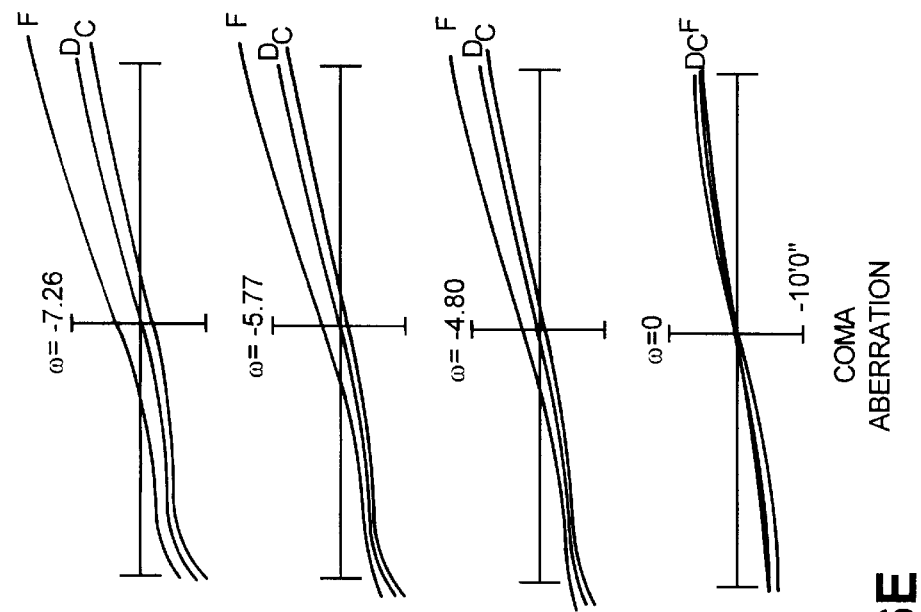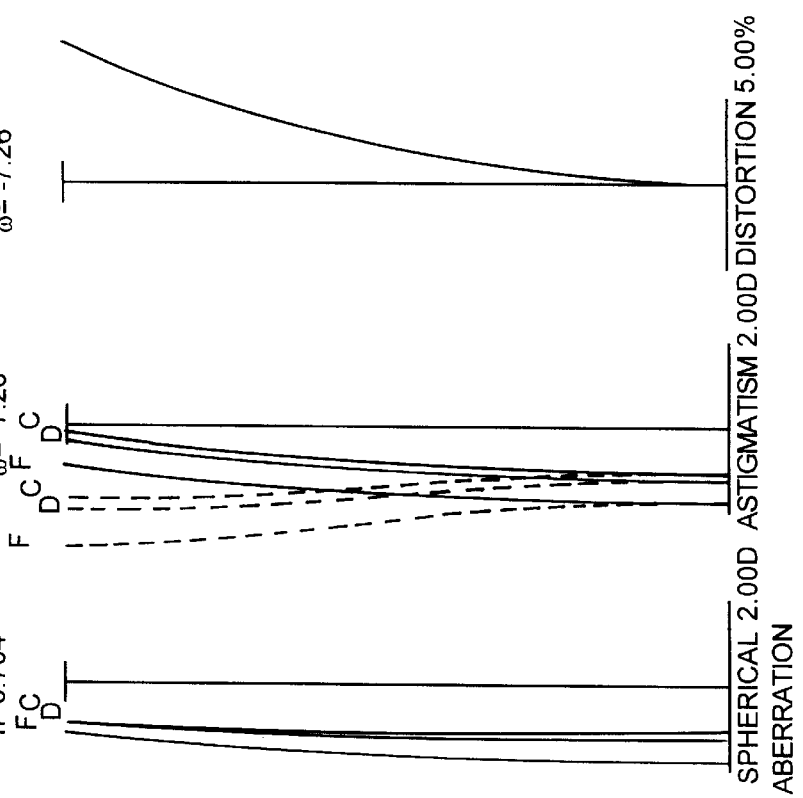

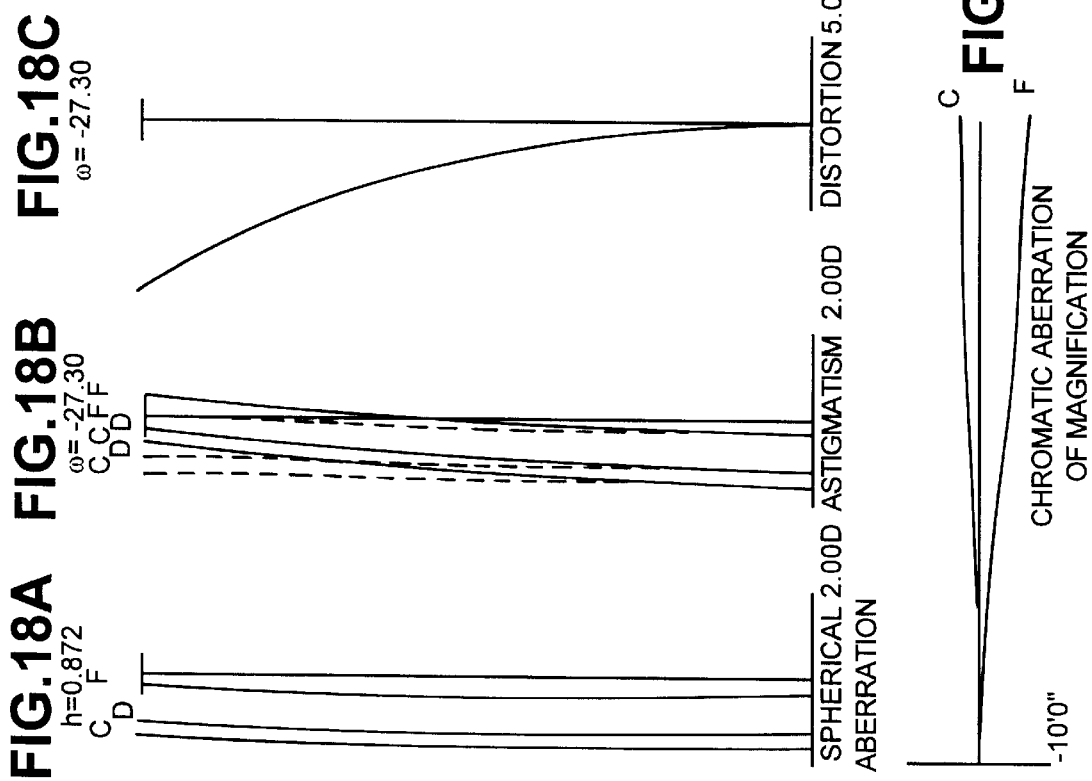

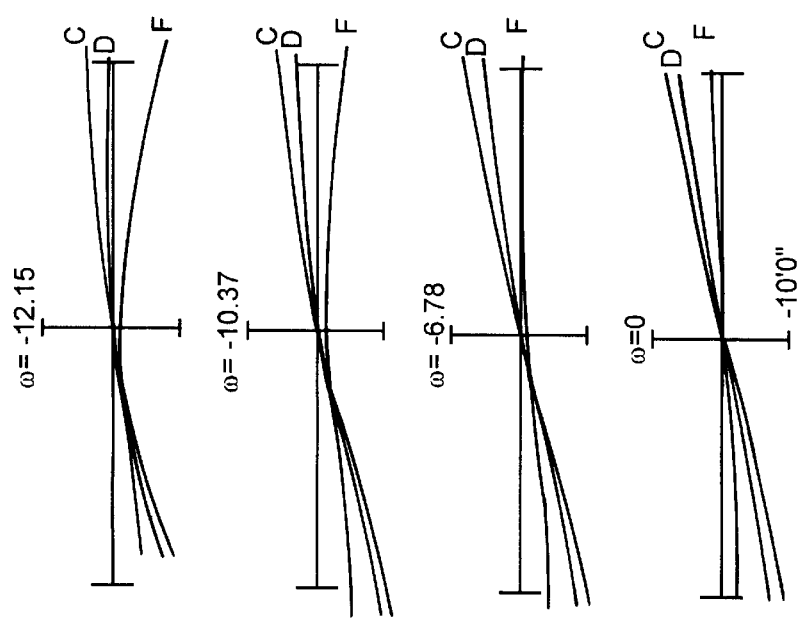
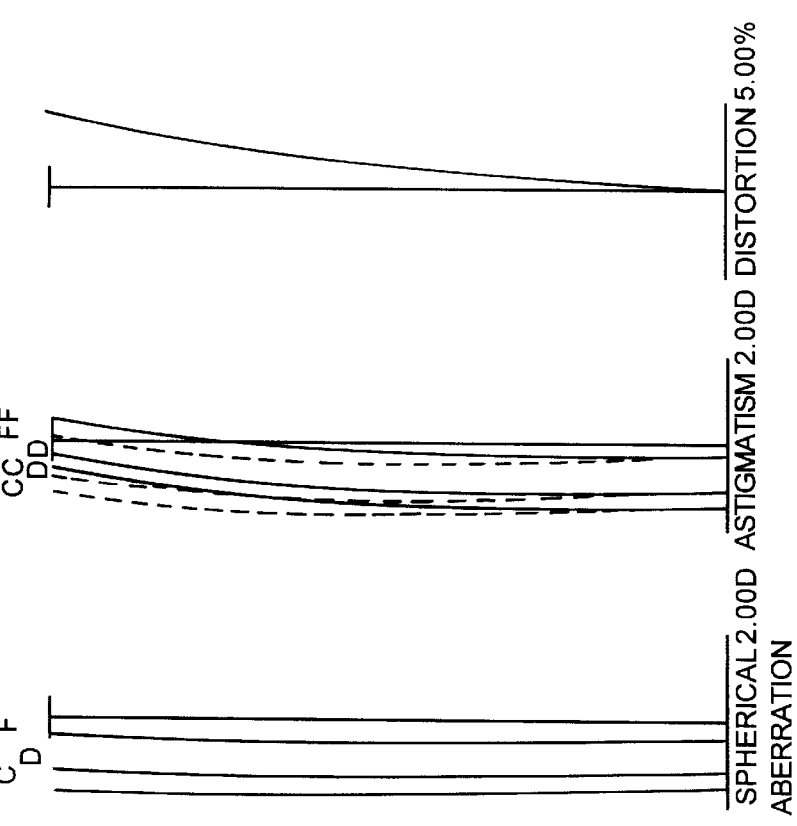
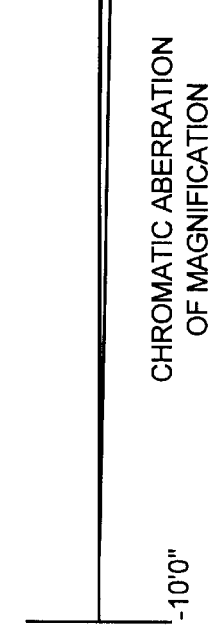

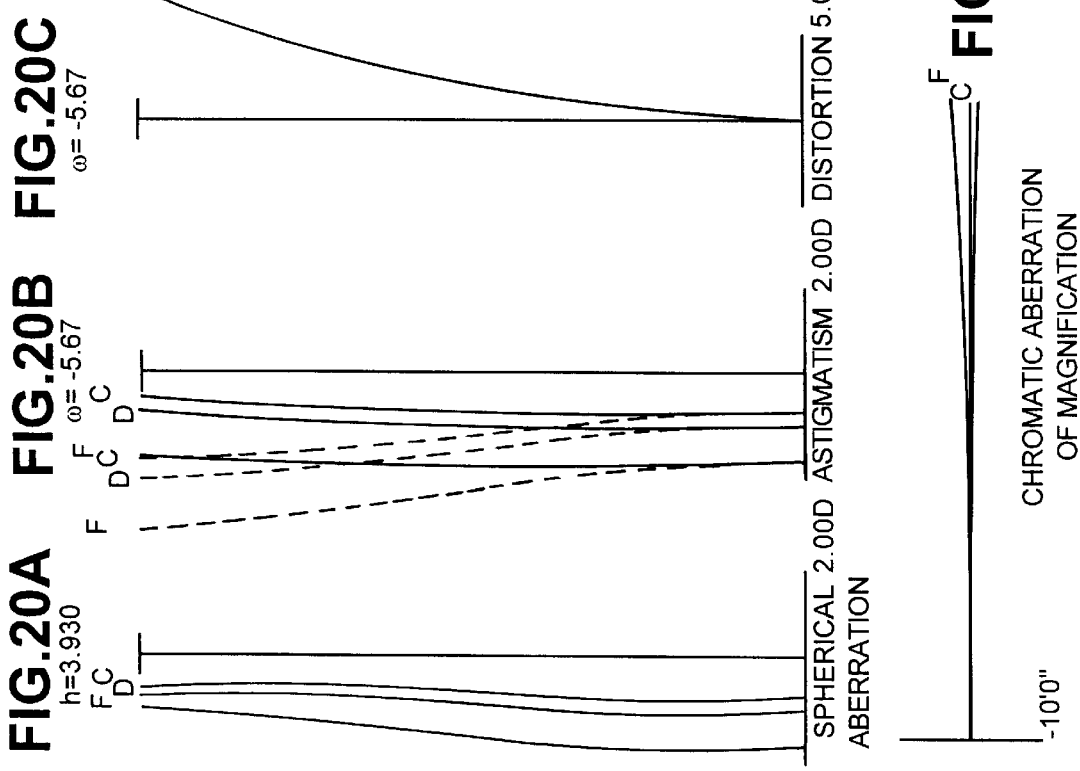

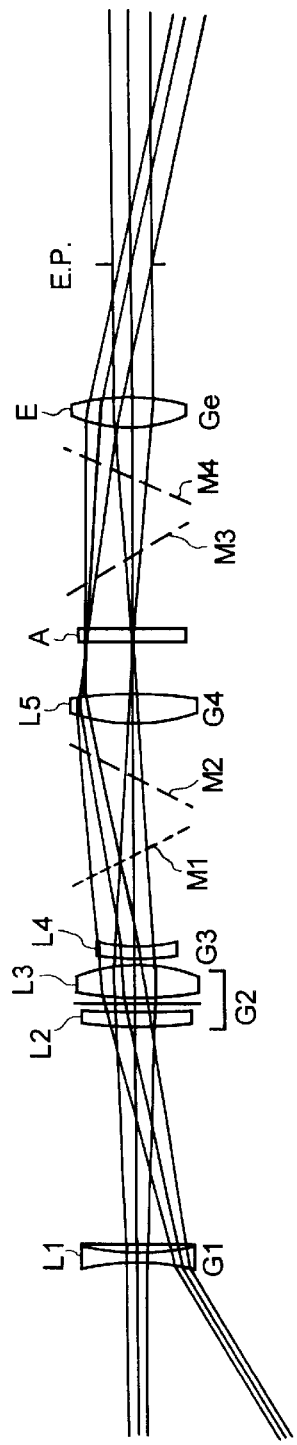
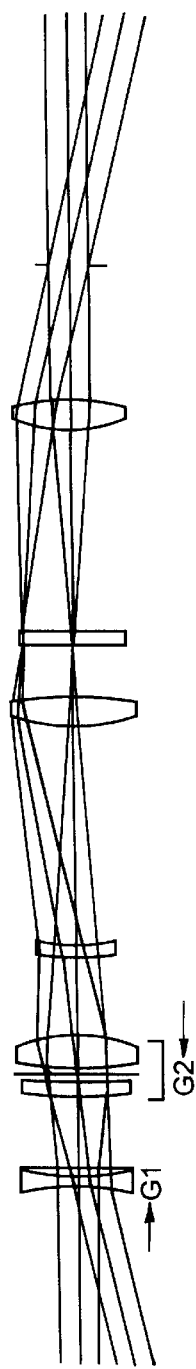
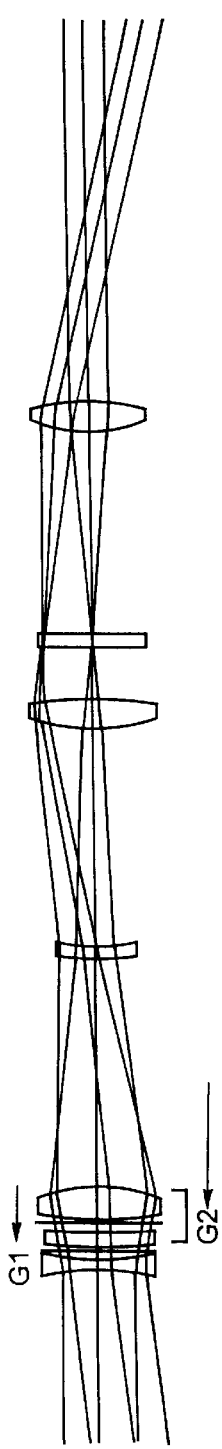
FIG. 21A
FIG. 21B
FIG. 21C

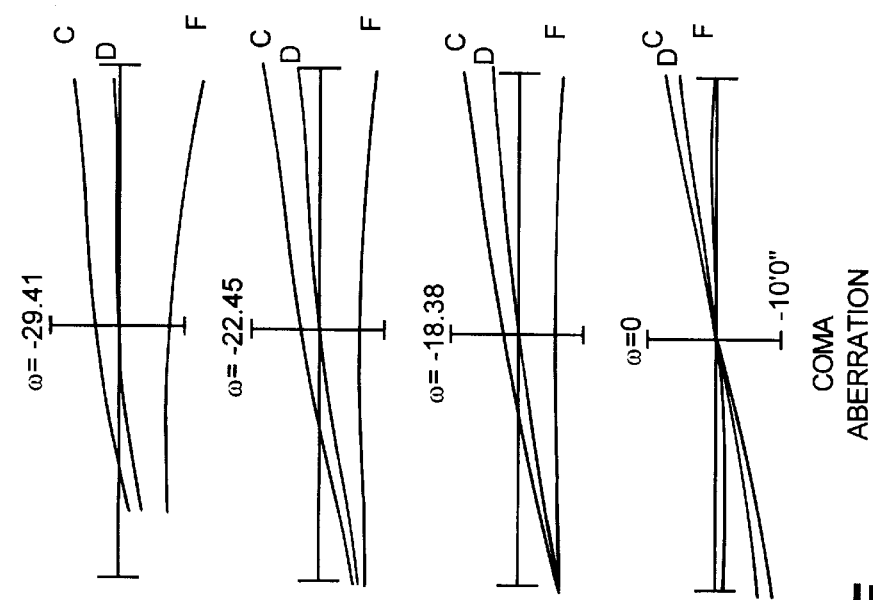
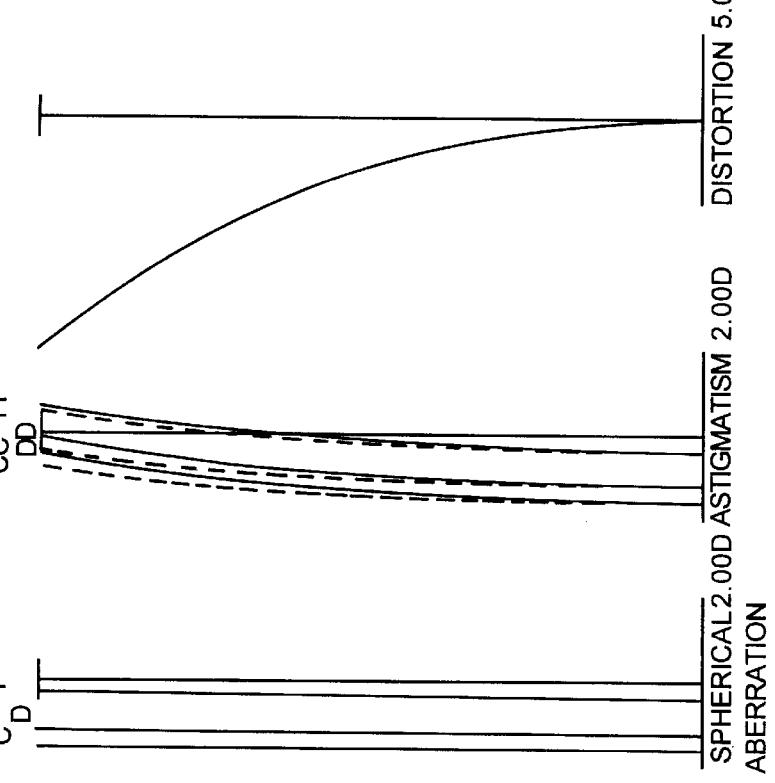
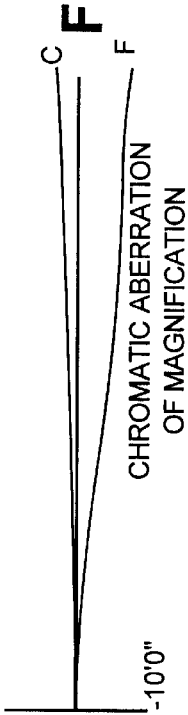

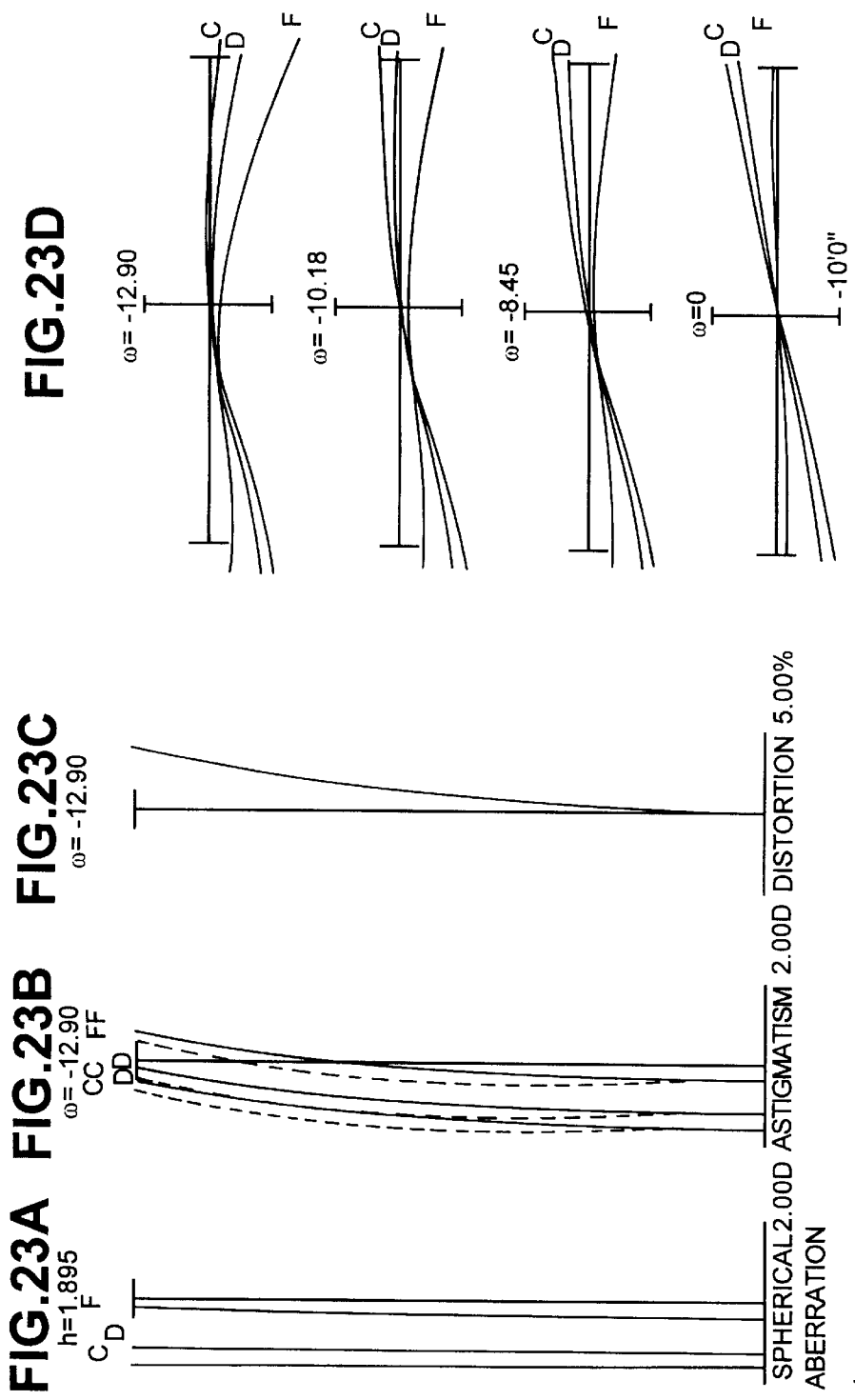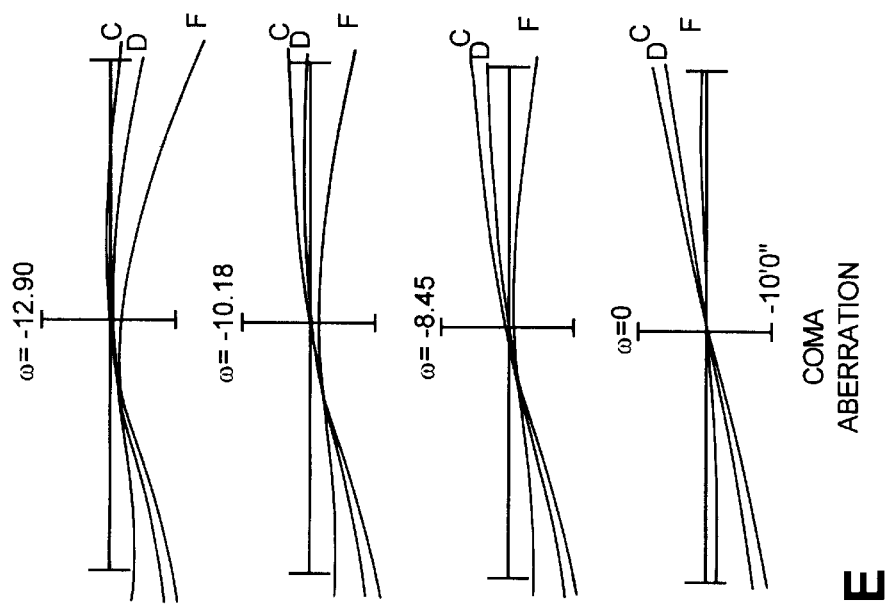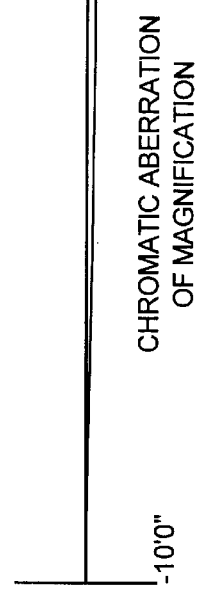

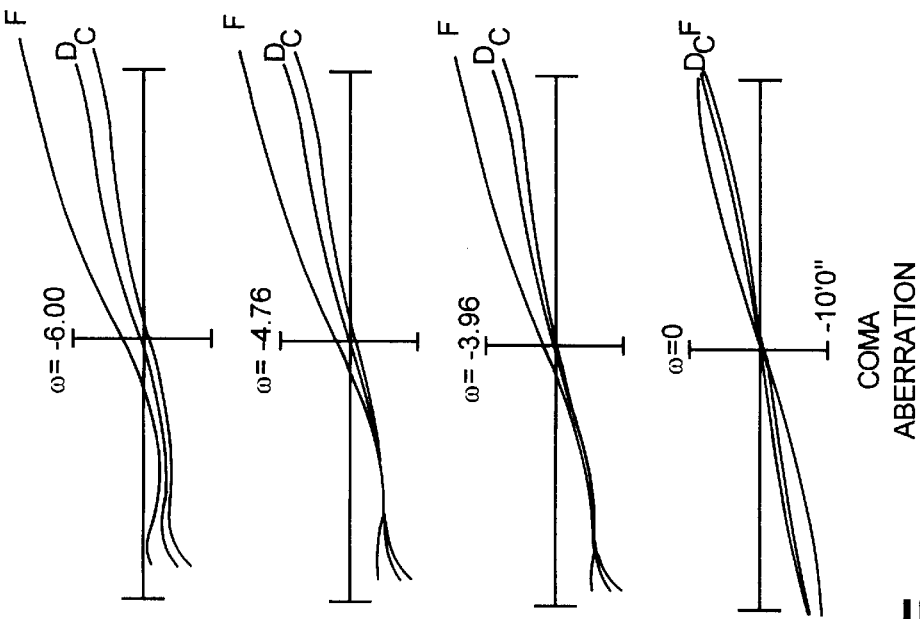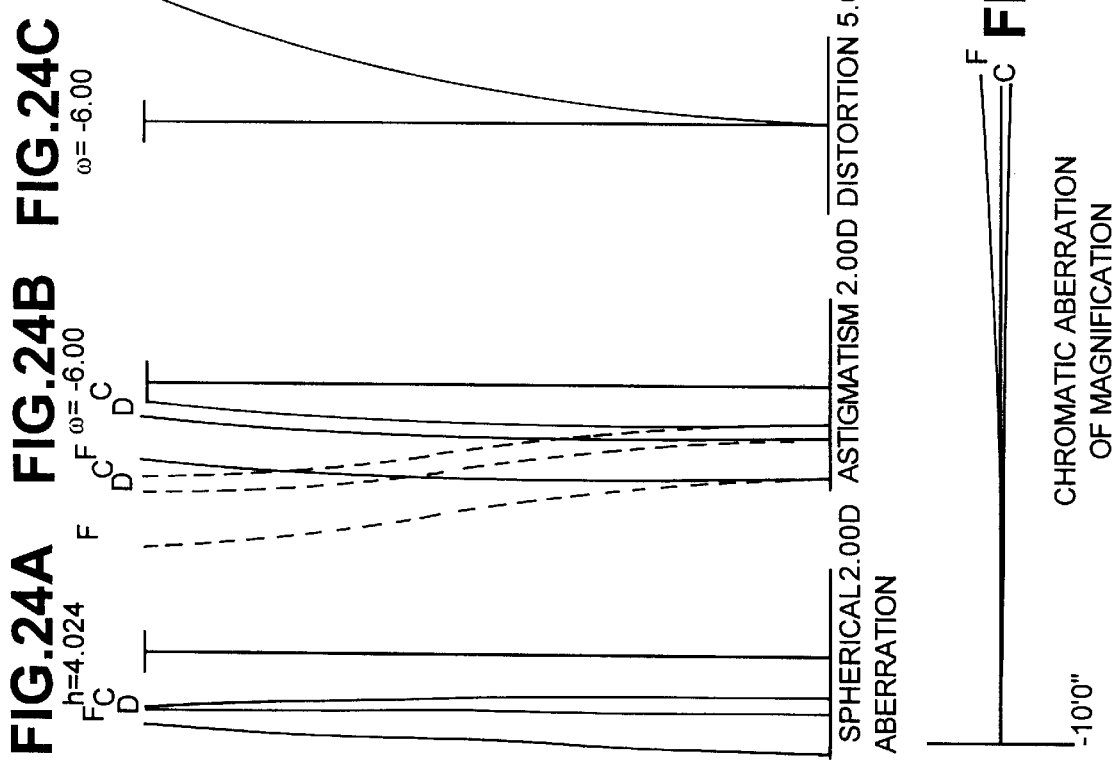

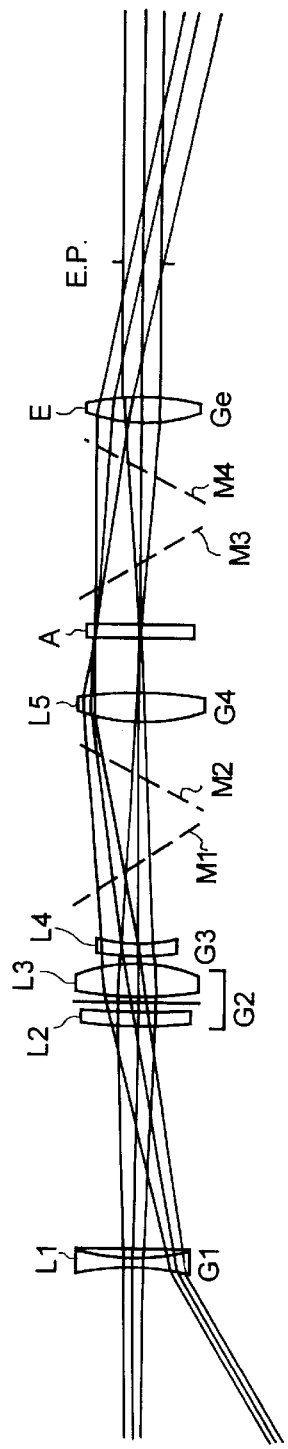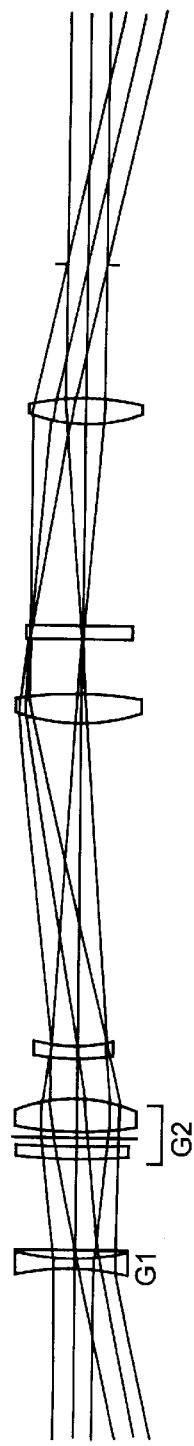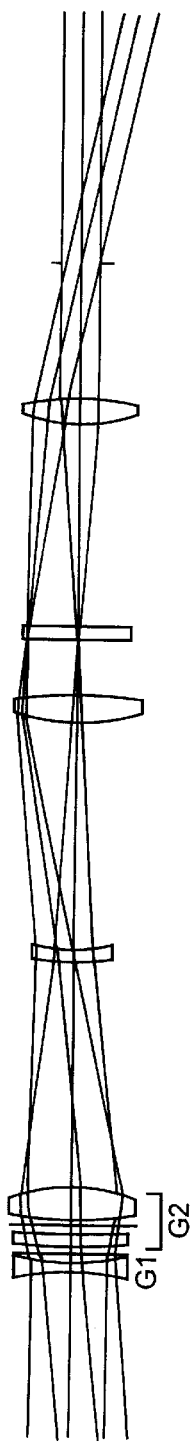

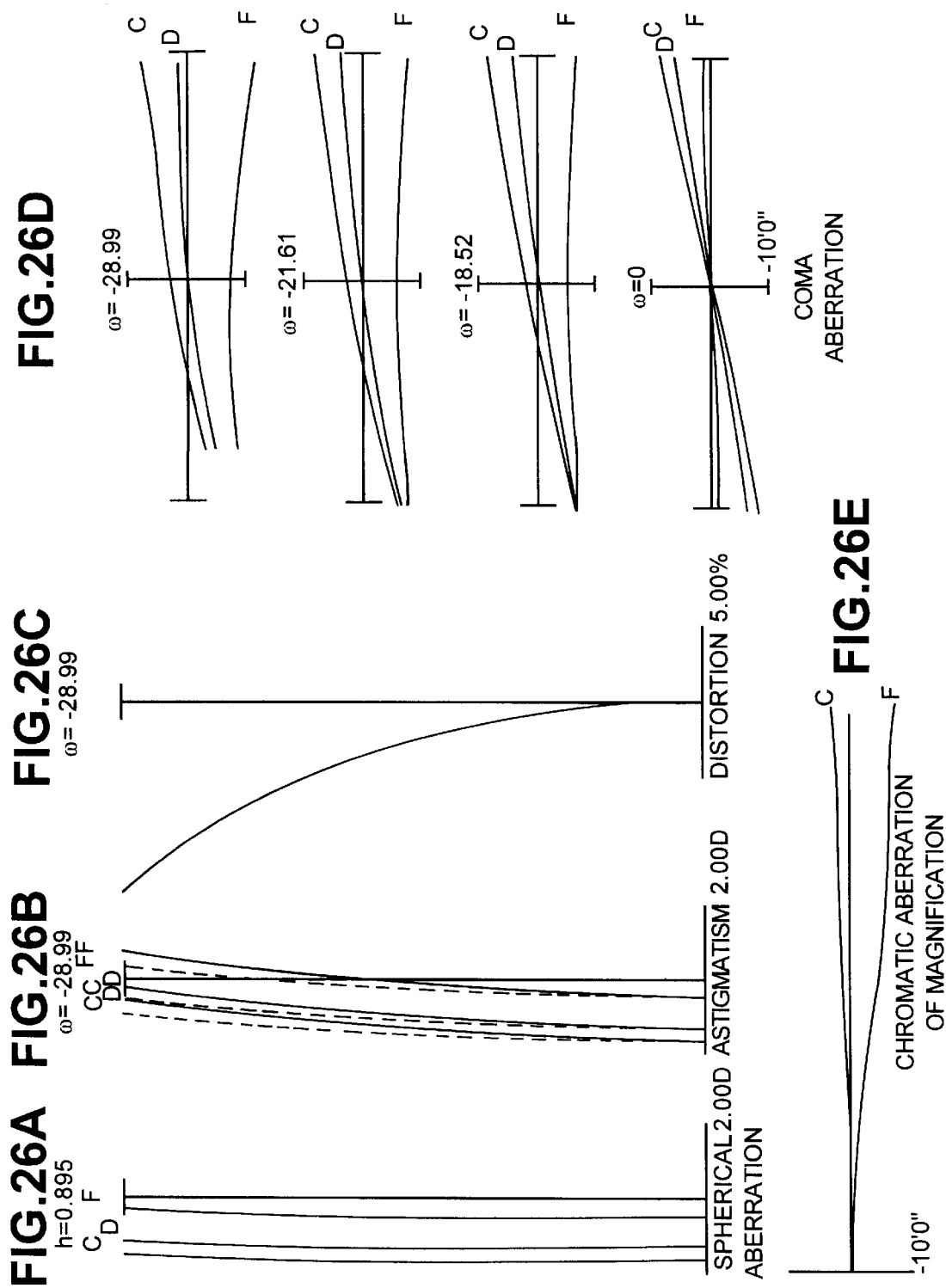

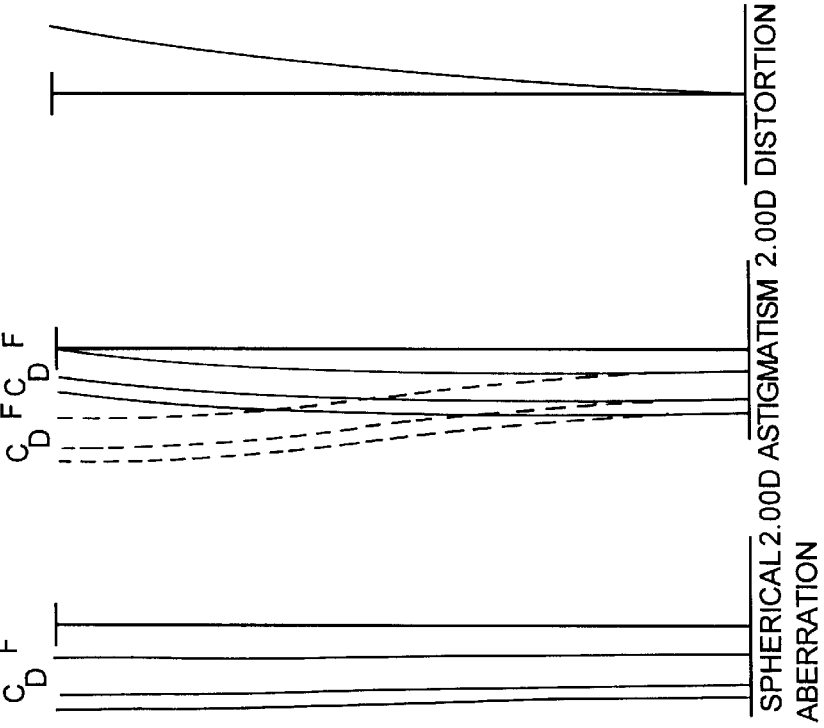

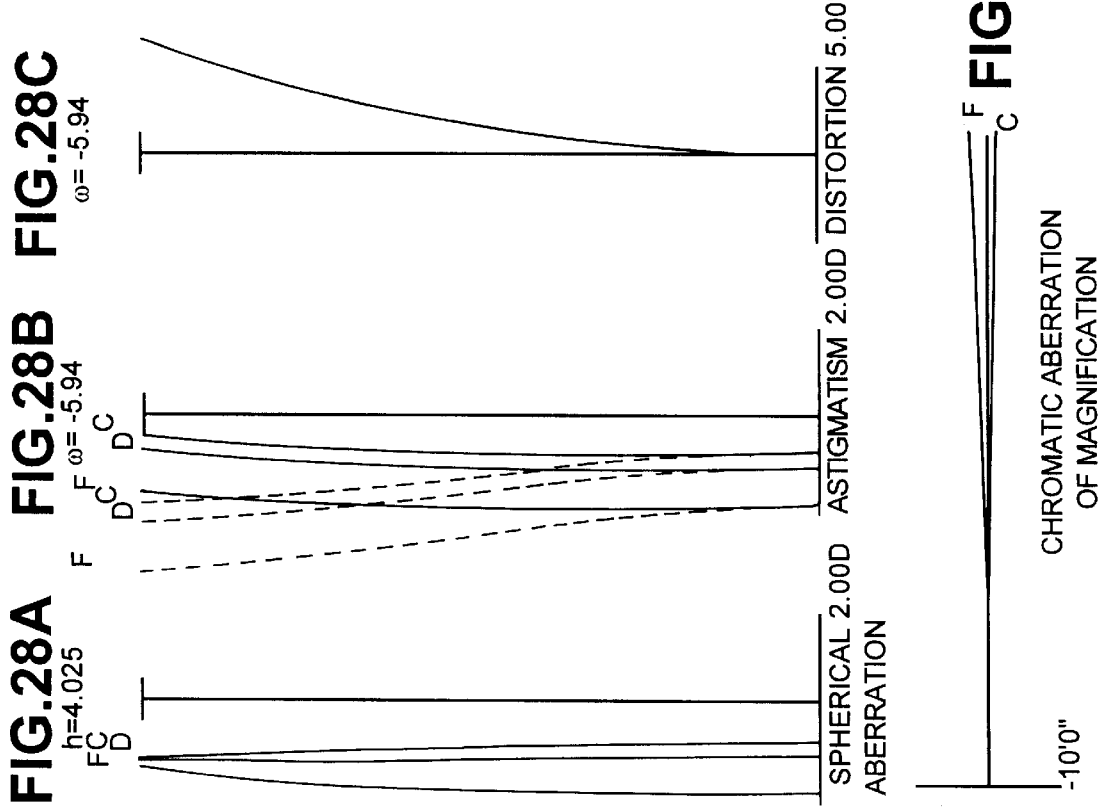

VIEWFINDER HAVING A HIGH MAGNIFICATION RATIO

BACKGROUND OF THE INVENTION

1. Field of the Invention

The present invention generally relates to a viewfinder with a high magnification ratio. In particular, the present invention relates to a variable magnification viewfinder for a lens-shutter camera or an electronic still camera.

2. Description of Related Art

In a Keplarian viewfinder composed of an objective lens having positive refractive power and an eyepiece lens having positive refractive power, a field frame or a reticle is disposed in the vicinity of a focal point of the objective lens. As a result, a region to be photographed or indications of various types of information can be viewed clearly. Thus, the Keplarian viewfinder is especially applicable as a viewfinder in a high-class lens-shutter camera.

Moreover, in the Keplarian viewfinder, an entrance pupil thereof is disposed inside of the viewfinder or on the object-side of the viewfinder. Therefore, there is an advantage in that a diameter of the objective lens does not become very large even when it is utilized in a so-called zoom viewfinder in which magnification of the viewfinder can be continuously varied and when the viewfinder is made to have a wider angle. Accordingly, the Keplarian viewfinder is often particularly used as a zoom viewfinder.

A Keplarian viewfinder including an objective lens having a first lens group with negative refractive power, a second lens group with positive refractive power, and a third lens group with negative refractive power has been used widely. This is because this type of viewfinder has high performance in spite of a compact and simple structure. This type of viewfinder has been disclosed, for example, in Japanese Laid-Open Patent Publication Nos. 3-233420 and No. 6-242377.

In a conventional viewfinder having a high magnification ratio, a field frame is disposed in the vicinity of a real image of an object which is formed via the objective lens, thereby providing a viewer with a clear field at an eyepoint. Therefore, a viewfinder having a high magnification ratio has been widely used in optical products, such as for example, a zoom viewfinder in a compact camera.

However, in a conventional viewfinder having a high magnification ratio, the magnification ratio is, at a maximum, about three. Therefore, the conventional viewfinder cannot go along with recent requirements for increased magnification ratios in the compact cameras.

SUMMARY OF THE INVENTION

It is an object of the present invention to provide a viewfinder having a high magnification ratio and an excellent aberration correction capability in a compact and simple structure.

In order to achieve this object, a viewfinder having a high magnification ratio according to the present invention includes, in order from an object, an objective lens group Go having positive refractive power, an information display portion A, disposed in the vicinity of a focal point of the objective lens group Go, for displaying information about photography, and an eyepiece lens group Ge having positive refractive power for viewing an image of an object formed via the objective lens group Go. The objective lens group Go includes a first lens unit G1 having negative refractive power, a second lens unit G2 having positive refractive power, and a third lens unit G3 having negative refractive power. The lens units G1, G2 and G3 are arranged in that order from the object. The second lens unit G2 is moved along an optical axis so that magnification of the viewfinder is varied. The first lens unit G1 includes at least one negative lens L1. The second lens unit G2 includes at least two positive lenses L2 and L3 arranged in order from the object. The third lens unit G3 includes at least one negative lens L4, and the positive lens L2 is formed so that an object-side surface thereof has an aspherical shape. In this viewfinder, the following condition is satisfied:

$$0.15 < f3/f2 < 0.6$$

where a focal length of the positive lens L2 is f2, and a focal length of the positive lens L3 is f3.

In a preferred embodiment of the present invention, the following condition is satisfied:

$$-0.3 < fA/fT < -0.2$$

where a focal length of the first lens unit G1 is fA, and a composite focal length of the first lens unit G1 through the third lens unit G3 at a largest magnification state is fT.

Moreover, it is preferable that the following conditions are satisfied:

$$0.2 < (ra+rb)/(ra-rb) < 0.34$$

$$1.3 < (rc+rd)/(rc-rd) < 2.0$$

where a radius of curvature of an object-side surface of the positive lens L3 is ra, a radius of curvature of an eyepoint-side surface of the positive lens L3 is rb, a radius of curvature of an object-side surface of the negative lens L4 is rc, and a radius of curvature of an eyepoint-side of the negative lens L4 is rd.

In a still preferred embodiment of the present invention, the following condition is satisfied:

$$0.46 < 100 \times S3/r3 < 0.3$$

where a paraxial radius of curvature of the object-side surface of the positive lens L2 is r3, and a distance along the optical axis between a position on the object-side surface of the positive lens L2 which is away from the optical axis in a direction perpendicular to the optical axis by r3/10 and a position on the object-side surface of the positive lens L2 which is positioned on the optical axis is S3.

Furthermore, it is preferable that the following condition is satisfied:

$$0.2 < fB/fT < 0.3$$

where a focal length of the second lens unit G2 is fB, and composite focal length of the first lens unit G1 through the third lens unit G3 at a largest magnification state is fT.

BRIEF DESCRIPTION OF THE DRAWINGS

FIGS. 1A to 1C are views showing an optical path of a viewfinder having a high magnification ratio according to a first example of the present invention.

FIG. 2 is a diagram showing various types of aberration at a smallest magnification state in the first example.

FIG. 3 is a diagram showing various types of aberration at an intermediate magnification state in the first example.

FIG. 4 is a diagram showing various types of aberration at a largest magnification state in the first example.

FIGS. 5A to 5C are views showing an optical path of a viewfinder having a high magnification ratio according to a second example of the present invention.

FIG. 6 is a diagram showing various types of aberration at the smallest magnification state in the second example.

FIG. 7 is a diagram showing various types of aberration at the intermediate magnification state in the second example.

FIG. 8 is a diagram showing various types of aberration at the largest magnification state in the second example.

FIGS. 9A to 9C are views showing an optical path of a viewfinder having a high magnification ratio according to a third example of the present invention.

FIG. 10 is a diagram showing various types of aberration at the smallest magnification state in the third example.

FIG. 11 is a diagram showing various types of aberration at the intermediate magnification state in the third example.

FIG. 12 is a diagram showing various types of aberration at the largest magnification state in the third example.

FIGS. 13A to 13C are views showing an optical path of a viewfinder having a high magnification ratio according to a fourth example of the present invention.

FIG. 14 is a diagram showing various types of aberration at the smallest magnification state in the fourth example.

FIG. 15 is a diagram showing various types of aberration at the intermediate magnification state in the fourth example.

FIG. 16 is a diagram showing various types of aberration at the largest magnification state in the fourth example.

FIG. 18 is a diagram showing various types of aberration at the smallest magnification state in the fifth example.

FIG. 19 is a diagram showing various types of aberration at the intermediate magnification state in the fifth example.

FIG. 20 is a diagram showing various types of aberration at the largest magnification state in the fifth example.

FIGS. 21A to 21C are views showing an optical path of a viewfinder having a high magnification ratio according to a sixth example of the present invention.

FIG. 22 is a diagram showing various types of aberration at the smallest magnification state in the sixth example.

FIG. 23 is a diagram showing various types of aberration at the intermediate magnification state in the sixth example.

FIG. 24 is a diagram showing various types of aberration at the largest magnification state in the sixth example.

FIGS. 25A to 25C are views showing an optical path of a viewfinder having a high magnification ratio according to a seventh example of the present invention.

FIG. 26 is a diagram showing various types of aberration at the smallest magnification state in the seventh example.

FIG. 27 is a diagram showing various types of aberration at the intermediate magnification state in the seventh example.

FIG. 28 is a diagram showing various types of aberration at the largest magnification state in the seventh example.

DESCRIPTION OF THE PREFERRED EMBODIMENTS

Figure 17A:
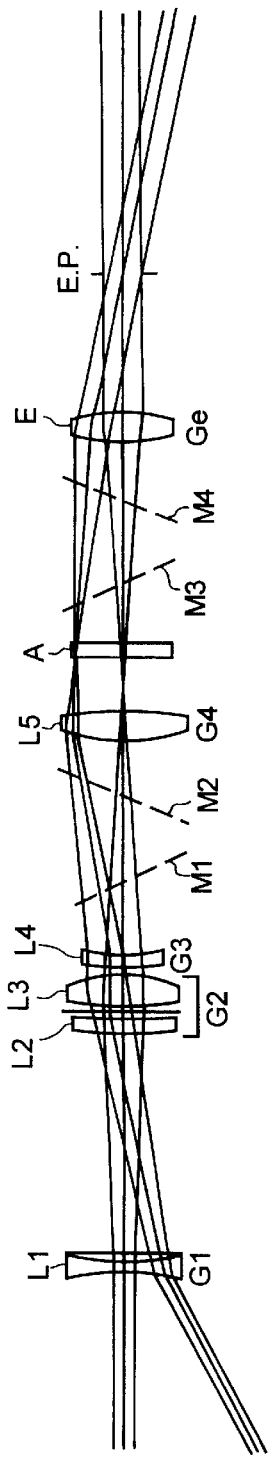
FIGS. 17A to 17C are views showing an optical path of a viewfinder having a high magnification ratio according to a firth example of the present invention.

A viewfinder of the present invention includes an objective lens group Go having positive refractive power. An information display portion A is disposed in the vicinity of a focal point of the objective lens group Go, for displaying information about photography. An eyepiece lens group Ge has a positive lens group for viewing an image of an object formed via the objective lens group Go. The group Go, the display portion A, and the group Ge are arranged in order from the object. The objective lens group Go includes a first lens unit G1 having negative refractive power, a second lens unit G2 having positive refractive power and a third lens unit G3 having negative refractive power, which are arranged in that order from the object.

The composite refractive power of the first lens unit G1 and the second lens unit G2 is always positive, and the first and second lens units G1 and G2 constitute a zoom objective portion in which a focal length is varied mainly by the movement of the second lens unit G2.

The third lens unit G3 has a function of a rear converter, i.e., a function of magnifying the focal length of the zoom objective portion constituted by the first and the second lens units G1 and G2, and an aberration correcting function, i.e., a function of correcting aberration which is not corrected by the zoom objective portion. In the viewfinder of the present invention, because the third lens unit G3 having negative refractive power, chromatic aberration of magnification and barrel distortion at a smallest magnification state (at a smallest magnification end), which are difficult to correct in a conventional three-part objective lens including a negative portion, a positive portion and a positive portion, can be corrected satisfactorily, while suppressing the movement of a movable lens so that it stays small.

In order to realize a simple structure in the viewfinder of the present invention which has, basically, the above-mentioned configuration, it is desirable to compose each of the lens groups, including the eyepiece lens group Ge, of a single lens. In this case, however, when an attempt is made to obtain a high magnification ratio of, for example, of four or more, correction of aberration, in particular, in the second lens unit G2 is insufficient. Therefore, by configuring the second lens unit G2 using at least two positive lenses L2 and L3, satisfactory aberration correction can be conducted over the whole range of variable magnification.

Moreover, in order to properly correct spherical aberration and variation in coma aberration, it is desirable for one lens surface of the second lens unit G2 to have a aspherical shape such that a converging effect becomes weak as a distance from an optical axis becomes large. As a result of various examinations, it has been found that a configuration in which a surface of the second lens unit G2 positioned closest to the object, i.e., an object-side surface of the positive lens L2 has an aspherical shape is most suitable for the structure of the present invention.

As described above, the present invention is characterized by configuring the second lens unit G2 using two positive lenses L2 and L3. In addition, as a refractive power distribution, a distribution in which the positive lens L2 and the positive lens L3 have substantially the same refractive power magnitude is generally used. However, various examinations have revealed that optimum correction of aberration can be realized when the positive lens L2, which is an aspherical lens, has considerably weaker power than the power (refractive power) of the positive lens L3.

Hereinafter, the respective conditions of the present invention will be described.

In the present invention, the following condition (1) is satisfied:

$$0.15 < f3/f2 < 0.6 \qquad (1)$$

where
 f2: a focal length of the positive lens L2; and
 f3: a focal length of the positive lens L3.

The condition (1) defines an appropriate range of a ratio of the focal length of the positive lens L3 and the focal length of the positive lens L2.

When the focal length ratio exceeds the upper limit of the condition (1), the refractive power of the positive lens L2 is too strong and, therefore, spherical aberration and variation of coma aberration which is varied between a smallest magnification state and an intermediate magnification state cannot be corrected satisfactorily. In addition, a position of a principal point of the second lens unit G2 is too close to the first lens unit G1 and, therefore, a mechanical interference between the second lens unit G2 and the third lens unit G3 an easily occur at the smallest magnification state. This causes the increase in the size of the objective lens group, or prevents the magnification ratio from being increased to four or more.

On the other hand, when the focal length ratio falls below the lower limit of the condition (1), the refractive power of the positive lens L3 is excessively strong. This makes the satisfactory correction of the spherical aberration difficult. Moreover, the position of the principal point of the second lens unit G2 is too close to the third lens unit G3. This necessitates increasing the size of the objective lens group or reducing the magnification ratio in order to avoid a mechanical interference between the first lens unit G1 and the second lens unit G2 at the largest magnification state (the largest magnification end).

A field frame or a reticle, as an information display portion which is disposed in the vicinity of the focal point of the objective lens group Go, is used for displaying a region to be photographed and/or various types of information which are required for photography. Here, the term "field frame" means a field stop composed of a thin plate of metal or the like, and the term "reticle" means an information display member in which the various types of information are formed on a transparent substrate. The viewfinder of the present invention needs to have at least one of the field frame and the reticle. In particular, it is desirable for the viewfinder of the present invention to include a reticle which can display not only the region to be photographed but also various types of information such as a zone of automatic focusing and a photometric range. It should be noted that a configuration in which both the field frame and the reticle are included or a configuration in which the field frame is not used by stamping the region to be photographed on the reticle may be employed.

The reticle is preferably formed from a parallel planar plate. This is because, when the reticle in the form of a parallel planer plate is used rather than a reticle formed on the lens surface, the cost can be suppressed, and an adverse effect of foreign foam-like material can be suppressed to a small extent because the reticle can be formed to be optically thin.

Furthermore, the eyepiece lens group Ge is used for viewing the image of the object formed by the objective lens group Go and an indication of the reticle while they are superimposed and magnified.

On the other hand, in a three-part objective lens group Go mentioned above, as a zooming technique for varying the focal length, a 1–2 units moving technique, in which the first lens unit G1 and the second lens unit G2 are moved, and a 2–3 units moving technique, in which the second lens unit G2 and the third lens unit G3 are moved, are considered. The viewfinder of the present invention can employ both the 1–2 units moving technique and the 2–3 units moving technique. However, in order to realize a high magnification ratio, it is desirable for the first lens unit G1 or the third lens unit G3 to take a U-shape track in light of suppressing variation of a pupil position and variation of astigmatism while reducing the size of the system.

Therefore, in the present invention, it is desirable that the following condition (2) is satisfied:

$$-0.3 < fA/fT < -0.2 \tag{2}$$

where
　fA: a focal length of the first lens unit G1; and
　fT: a composite focal length of the first lens unit G1 to the third lens unit G3 at the largest magnification state.

The condition (2) corresponds to a condition for realizing the system with the reduced size, and defines a moving track of the first lens unit G1 or the third lens unit G3.

When a value of fA/fT falls below the lower limit of the condition (2), the first lens unit G1 or the third lens unit G3 does not take the U-shaped track, and a moving amount of each lens group when the magnification is varied is increased. As a result, the system becomes larger in size, and it becomes difficult to suppress the variation of the pupil position. Therefore, this is not preferable. In addition, in order for the first lens unit G1 or the third lens unit G3 to take the U-shaped track while the value of fA/fT is below the lower limit of the condition (2), it is necessary to excessively weaken the refractive power of the third lens unit G3. In this case, however, an advantageous effect of the three-part structure cannot be attained and, therefore, the moving amount of each lens group during the zooming operation (the magnification varying operation) becomes larger and distortion and chromatic aberration of magnification at the smallest magnification state become difficult to be corrected.

When the value of fA/fT exceeds the upper limit of the condition (2), the refractive power of the first lens unit G1 becomes strong and a composite magnification of the second lens unit G2 and the third lens unit G3 becomes excessively large at the largest magnification state. As a result, although a reduced-sized system is realized, aberration correction at the largest magnification state, in particular correction of spherical aberration, becomes difficult. Thus, this case is not preferable.

At this time, it is desirable that the focal length fB of the second lens unit G2 satisfies the following condition (6).

$$0.2 < fB/fT < 0.3 \tag{6}$$

When a value of fB/fT exceeds the upper limit of the condition (6), the system becomes larger in size. Therefore, this is not preferable.

To the contrary, when the value of fB/fT falls below the lower limit of the condition (6), it is difficult to increase the magnification ratio. Therefore, this is not preferable.

Moreover, according to the present invention, in order to direct a bundle of light beams to an appropriate eyepoint position, it is desirable to dispose a fourth lens unit G4 having positive refractive power between the third lens unit G3 and the information display portion (the field frame or the reticle) A. Furthermore, by forming at least one surface in the fourth lens unit G4 to have an aspherical shape such that a converging effect becomes weaker as a distance from an optical axis increases, variation of spherical aberration when the magnification is varied can be corrected more excellently, and a viewfinder in which spherical aberration in a pupil is small and which is easy to be viewed can be realized.

Moreover, according to the present invention, in order to reduce the size while the large magnification ratio is realized, it is desirable to have the composite magnification β34W of the third lens unit G3 and the fourth lens unit G4 be 1.3 or more at the smallest magnification state. Furthermore, it is desirable to have the composite magnification β34W be 1.5 times or less because the aberration correction fails when the composite magnification β34W is too large.

That is, in the present invention, it is desirable that the composite magnification β34W of the third lens unit G3 and the fourth lens unit G4 at the smallest magnification state satisfies the following condition (7).

$$1.3 < \beta 34W < 1.5 \tag{7}$$

In addition, according to the present invention, it is preferable that the following conditions (3) and (4) are satisfied:

$$0.2 < (ra+rb)/(ra-rb) < 0.34 \tag{3}$$

$$1.3 < (rc+rd)/(rc-rd) < 2.0 \tag{4}$$

where
- ra is a radius of curvature of an object-side surface of the positive lens L3;
- rb is a radius of curvature of an eyepoint-side surface of the positive lens L3;
- rc is a radius of curvature of an object-side surface of the negative lens L4; and
- rd is a radius of curvature of an eyepoint-side surface of the negative lens L4.

The condition (3) defines a condition necessary for keeping a balance of spherical aberration and an image plane.

When a value of (ra+rb)/(ra−rb) exceeds the upper limit of the condition (3), the image plane has plus diopter while the spherical aberration has minus diopter. Therefore, this is not preferable.

To the contrary, when the value of (ra+rb)/(ra−rb) falls below the lower limit of the condition (3), since the image plane has minus diopter while the spherical aberration has plus diopter, this is not preferable.

The condition (4) defines a condition for correcting distortion.

When a value of (rc+rd)/(rc−rd) falls below the lower limit of the condition (4), correction of distortion becomes difficult, and correction of the spherical aberration fails when the correction of the distortion is attempted. Therefore, this is not preferable.

When the value of (rc+rd)/(rc−rd) exceeds the upper limit of the condition (4), astigmatic difference becomes larger at the largest magnification state. Therefore, this is not preferable.

As described before, according to the present invention, in order to correct the spherical aberration, it is desirable that the object-side surface of the positive lens L2 in the second lens unit G2 is formed to have an aspherical shape. In this case, in order to correct the spherical aberration more satisfactorily, it is desirable to satisfy the following condition (5):

$$0.46 < 100 \times S3/r3 < 0.3 \tag{5}$$

where
- r3 is a paraxial radius of curvature of the object-side surface of the positive lens L2; and
- S3 is a distance along an optical axis between a position on the object-side surface of the positive lens L2 which is away from the optical axis in a direction perpendicular to the optical axis by r3/10 and a position thereon which is located on the optical axis.

In general, a shape of an aspherical surface is represented by the following expression (a):

$$S(y)=(y^2/R)/\{1+(1-\kappa \times y^2/R^2)^{1/2}\}+C_2 x y^2+C_4 x y^4+C_6 x y^6+C_8 x y^8+C_{10} \times y^{10}+\ldots \tag{a}$$

where a height in a direction perpendicular to the optical axis is y, displacement amount (sag amount) in the optical axis direction at the height y is S (y), a radius of curvature of the standard (a radius of curvature of a vertex) is R, the conical coefficient is κ, and the n-th order aspherical coefficient is Cn.

Moreover, a paraxial radius of curvature r of the aspherical surface is defined by the following expression (b):

$$r=1/(2C_2+1/R) \tag{b}$$

Thus, a value of S3 in the condition (5) corresponds to the sag amount S (r3/10) in the expression (a).

When a value of 100×S3/r3 exceeds the upper limit of the condition (5), the effect of the aspherical surface becomes too weak and, therefore, the spherical aberration cannot be corrected satisfactorily. Thus, this is not preferable.

When the value of 100×S3/r3 falls below the lower limit of the condition (5), however, the effect of the aspherical surface becomes too strong and, therefore, the spherical aberration cannot be corrected satisfactorily. Thus, this is also not preferable.

In order to view an erected image in the viewfinder of the present invention, it is necessary to dispose at least four reflecting surfaces in an optical path of the optical system so as to erect a viewfinder image. Although various erecting techniques have been known, it is desirable in the present invention to dispose two reflecting surfaces between the third lens unit G3 and the fourth lens unit G4 and to dispose two reflecting surfaces between the information display portion A and the eyepiece lens group Ge so as to obtain the erected image. This is because negative refractive power of the third lens unit G3 in the viewfinder of the present invention is larger as compared to that in the conventional viewfinder in order to reduce the size, thereby allowing two reflecting surfaces to be disposed between the third lens unit G3 and the fourth lens unit G4 without difficulty. Moreover, in this case, the number of the reflecting surfaces disposed between the information display portion A and the eyepiece lens group Ge is only two. This provides an advantageous effect that a viewfinder magnification can be set to be high.

EXAMPLES

The respective examples of the present invention will be explained with reference to the attached drawings.

In the respective examples, an aspherical surface is represented by the aforementioned expression (a).

The aspherical surface is denoted by adding a mark "*" on the right-side of the surface number in a table of various items in each example. In addition, an imaging position of an objective lens group Go is denoted by adding a mark "F" on the right-side of the surface number.

First Example

FIGS. 1A to 1C are developed views of an optical path of a viewfinder having a high magnification ratio according to a first example of the present invention. FIG. 1A shows a lens arrangement at a smallest magnification state; FIG. 1B shows a lens arrangement at an intermediate magnification state; and FIG. 1C shows a lens arrangement at a largest magnification state.

In FIGS. 1A to 1C, an objective lens group Go includes a first lens unit G1 composed of a double-concave lens L1 in which an eyepoint-side surface is formed to be aspherical; a second lens unit G2 composed of a double-convex lens L2 in which an object-side surface is formed to be aspherical and a double-convex lens L3; a third lens unit G3 composed of a negative meniscus lens L4 with a convex surface thereof facing the object; and a fourth lens unit G4 composed of a double-convex lens L5 in which an object-side surface is formed to be aspherical, which are arranged in that order from an object. Moreover, an eyepiece lens group Ge is composed of a double-convex lens E having an object-side surface formed so as to be aspherical.

A dach mirror M1 having two reflecting surfaces perpendicular to each other is disposed between the third lens unit G3 and the fourth lens unit G4. A reticle A as an information display portion is disposed in the vicinity of a focal point of the objective lens group Go. Moreover, a penta-prism P having two reflecting surfaces is disposed between the reticle A and the eyepiece lens group Ge.

The lenses L2, L3, L5 and E are formed of a methacrylic resin. The lenses L1 and L4 are formed of an MAS resin (which is copolymer of methacryl and polystyrene) for the purpose of correcting chromatic aberration. Moreover, the reticle A and the penta-prism P are formed of glass.

As shown in FIGS. 1A to 1C, when the magnification is varied from the smallest magnification state to the largest magnification state, the first lens unit G1 is moved along a track which is concave toward the object in accordance with the movement of the second lens unit G2 in a direction from the eyepoint toward the object.

In this way, in the first example, a real image of the object via the objective lens group Go is formed on the object-side surface of the reticle A. The eyepiece lens E converges light beams from the image of the object at the eyepoint E.P. Accordingly, the real image of the object can be viewed via the eyepiece lens E at the eyepoint E.P.

Values of various items in the first example of the present invention will be listed in the following table (1). In the table (1), m denotes a viewfinder magnification, X denotes diopter, $2\omega$ denotes an angle of view, EP denotes an eyepoint, and 2H' denotes a pupil diameter. Numerals at the left end indicate the order of each lens surface from the object, r denotes a radius of curvature of each lens surface (a radius of curvature R of the standard when the lens surface is aspherical), d is a distance between lens surfaces, and n and ν are a refractive index and Abbe constant for d-ray ($\lambda$=587.6 nm), respectively. In all tables, unless otherwise indicated, lengths, distances and so on are in mm and angles are in degrees.

TABLE 1

| | | | |
|---|---|---|---|
| m = | 0.490 to 1.874 | | |
| x = | −1.00D | | |
| 2ω = | 54.7° to 13.3° | | |
| EP = | 15.0 | | |
| 2H' = | 4.0 | | |

| | r | d | ν | n |
|---|---|---|---|---|
| 1 | −20.7825 | 1.2000 | 33.59 | 1.571100 |
| 2* | 19.3217 | (d2 = variable) | | |
| 3* | 32.4528 | 2.4000 | 57.8Z | 1.491500 |
| 4 | −56.3885 | 1.5000 | | |
| 5 | 29.6151 | 3.7000 | 57.82 | 1.491500 |
| 6 | −15.7439 | (d6 = variable) | | |
| 7 | 97.1142 | 1.2000 | 33.59 | 1.571100 |

TABLE 1-continued

| | r | d | ν | n |
|---|---|---|---|---|
| 8 | 17.6443 | 25.0000 | | |
| 9* | 17.1872 | 3.6000 | 57.82 | 1.491500 |
| 10 | −46.9183 | 6.7000 | | |
| 11F | ∞ | 1.0000 | 58.80 | 1.522160 |
| 12 | ∞ | 1.0000 | | |
| 13 | ∞ | 37.2150 | 25.50 | 1.804581 |
| 14 | ∞ | 0.8000 | | |
| 15* | 21.0000 | 3.2000 | 57.82 | 1.491500 |
| 16 | −27.1800 | 15.0000 | | |

(eyepoint)
(Data of the aspherical surfaces)

| | κ | $C_2$ | $C_4$ |
|---|---|---|---|
| 2nd surface | −3.5313 | 0.0 | 0.0 |
| | $C_6$ | $C_8$ | $C_{10}$ |
| | $-5.5017 \times 10^{-7}$ | $1.2487 \times 10^{-8}$ | $1.5513 \times 10^{-17}$ |
| | κ | $C_2$ | $C_4$ |
| 3rd surface | −35.3586 | 0.0 | 0.0 |
| | $C_6$ | $C_8$ | $C_{10}$ |
| | $-2.6659 \times 10^{-6}$ | $6.3299 \times 10^{-8}$ | $-9.2793 \times 10^{-10}$ |
| | κ | $C_2$ | $C_4$ |
| 9th surface | −1.3000 | 0.0 | 0.0 |
| | $C_6$ | $C_8$ | $C_{10}$ |
| | 0.0 | 0.0 | 0.0 |
| | κ | $C_2$ | $C_4$ |
| 15th surface | −1.7000 | 0.0 | 0.0 |
| | $C_6$ | $C_8$ | $C_{10}$ |
| | 0.0 | $-6.0000 \times 10^{-10}$ | 0.0 |

(Variable distances when the magnification is varied)

| | smallest magnification | intermediate magnification | largest magnification |
|---|---|---|---|
| magnification | 0.49021 | 0.95854 | 1.87427 |
| d2 | 23.79894 | 9.22733 | 1.77516 |
| d6 | 0.70105 | 8.15323 | 22.72484 |

(Values corresponding to the respective conditions)

| | |
|---|---|
| (1) f3/f2 | = 0.508 |
| (2) fA/fT | = −0.255 |
| (3) (ra + rb)/(ra − rb) | = 0.306 |
| (4) (rc + rd)/(rc − rd) | = 1.444 |
| (5) 100×S3/r3 | = 0.455 |
| (6) fB/fT | = 0.224 |
| (7) β34W | = 1.350 |

FIGS. 2 through 4 are diagrams showing various types of aberration in the first example. FIG. 2 shows the various types of aberration at the smallest magnification state, FIG. 3 shows the various types of aberration at the intermediate magnification state, and FIG. 4 shows the various types of aberration at the largest magnification state.

In the respective aberration diagrams, h denotes an incident height, ω denotes a half angle of view, C denotes C-ray ($\lambda$=656.3 nm), D denotes d-ray ($\lambda$=587.6 nm) and F denotes F-ray ($\lambda$=486.1 nm). Again, lengths, heights and so on are in mm and angles are in degrees.

In addition, in the diagrams showing astigmatism, a solid line is used for indicating a sagital image plane and a broken line is used for indicating a meridional image plane. Moreover, in the diagrams showing spherical aberration and the diagrams showing the astigmatism, D indicates diopter. Furthermore, the diagrams showing chromatic aberration of magnification and the diagrams showing coma aberration are shown using a unit system including degree, minute and second.

As is apparent from the respective aberration diagrams, the various types of aberration are corrected satisfactorily over the respective magnification states from the smallest magnification state to the largest magnification state in the present example.

Second Example

FIGS. 5A to 5C are developed views of an optical path of a viewfinder having a high magnification ratio according to a second example of the present invention. FIG. 5A shows a lens arrangement at the smallest magnification state; FIG. 5B shows a lens arrangement at the intermediate magnification state; and FIG. 5C shows a lens arrangement at the largest magnification state.

In FIG. 5A to 5C, an objective lens group Go includes a first lens unit G1 composed of a double-concave lens L1 in which an eyepoint-side surface is formed to be aspherical; a second lens unit G2 composed of a double-convex lens L2 in which an object-side surface is formed to be aspherical and a double-convex lens L3; a third lens unit G3 composed of a negative meniscus lens L4 with a convex surface thereof facing the object; and a fourth lens unit G4 composed of a double-convex lens L5 in which an object-side surface is formed to be aspherical, which are arranged in that order from an object. Moreover, an eyepiece lens group Ge is composed of a double-convex lens E having an object-side surface formed so as to be aspherical.

Two reflecting mirrors M1 and M2 are disposed between the third lens unit G3 and the fourth lens unit G4. A reticle A as an information display portion is disposed in the vicinity of a focal point of the objective lens group Go. Moreover, two reflecting mirrors M3 and M4 are disposed between the reticle A and the eyepiece lens group Ge.

The lenses L2, L3, L5 and E are formed of a methacrylic resin. The lenses L1 and L4 are formed of an MAS resin (which is copolymer of methacryl and polystyrene) and polycarbonate, respectively, for the purpose of correcting chromatic aberration. Moreover, the reticle A is formed of glass.

As shown in FIGS. 5A to 5C, when the magnification is varied from the smallest magnification state to the largest magnification state, the first lens unit G1 is moved along a track which is concave toward the object in accordance with the movement of the second lens unit G2 in a direction from the eyepoint toward the object.

In this way, also in the second example, a real image of the object via the objective lens group Go is formed on the object-side surface of the reticle A. The eyepiece lens E converges light beams from the image of the object at the eyepoint E.P. Accordingly, the real image of the object can be viewed via the eyepiece lens E at the eyepoint E.P.

Values of various items in the second example of the present invention will be listed in the following table (2). In the table (2), m denotes a viewfinder magnification, X denotes diopter (unit D: diopter), 2ω denotes an angle of view, EP denotes an eyepoint, and 2H' denotes a pupil diameter. Numerals at the left end indicate the order of each lens surface from the object, r denotes a radius of curvature of each lens surface (a radius of curvature R of the standard when the lens surface is aspherical), d is a distance between lens surfaces, and n and ν indicate a refractive index and Abbe constant for d-ray (λ=587.6 nm), respectively.

TABLE 2 m = 0.500 tO 1.912
X = −1.00D
2ω = 54.7° to 13.3°
EP = 15.0
2H' = 4.0

|   | r | d | ν | n |
|---|---|---|---|---|
| 1 | −20.8295 | 1.2000 | 33.59 | 1.571100 |
| 2* | 19.2811 | (d2 = variable) | | |
| 3* | 32.2991 | 2.4000 | 57.82 | 1.491500 |
| 4 | −57.9669 | 1.5000 | | |
| 5 | 29.5942 | 3.7000 | 57.82 | 1.491500 |
| 6 | −15.6653 | (d6 = variable) | | |
| 7 | 88.5354 | 1.2000 | 29.90 | 1.583000 |
| 8 | 17.6118 | 25.0000 | | |
| 9* | 17.2135 | 3.6000 | 57.82 | 1.491500 |
| 10 | −46.6694 | 6.7000 | | |
| 11F | ∞ | 1.0000 | 58.80 | 1.522160 |
| 12 | ∞ | 22.0000 | | |
| 13* | 18.8900 | 3.4000 | 57.82 | 1.491500 |
| 14 | −30.0000 | 15.0000 | | |
| 15 | (eyepoint) | | | |

(Data of the aspherical surfaces)

|   | κ | $C_2$ | $C_4$ |
|---|---|---|---|
| 2nd surface | −3.5406 | 0.0 | 0.0 |
|   | $C_6$ | $C_8$ | $C_{10}$ |
|   | $-5.4929 \times 10^{-6}$ | $1.2595 \times 10^{-8}$ | $1.5513 \times 10^{-17}$ |
|   | κ | $C_2$ | $C_4$ |
| 3rd surface | −35.3880 | 0.0 | 0.0 |
|   | $C_6$ | $C_8$ | $C_{10}$ |
|   | $-2.7109 \times 10^{-6}$ | $6.4308 \times 10^{-8}$ | $-9.4330 \times 10^{-10}$ |
|   | κ | $C_2$ | $C_4$ |
| 9th surface | −1.3000 | 0.0 | 0.0 |
|   | $C_6$ | $C_8$ | $C_{10}$ |
|   | 0.0 | 0.0 | 0.0 |
|   | κ | $C_2$ | $C_4$ |
| 13th surface | −1.0300 | 0.0 | 0.0 |
|   | $C_6$ | $C_8$ | $C_{10}$ |
|   | 0.0 | $-5.0000 \times 10^{-10}$ | 0.0 |

(Variable distances when the magnification is varied)

|   | smallest magnification | intermediate magnification | largest magnification |
|---|---|---|---|
| magnification | 0.50001 | 0.97789 | 1.91250 |
| d2 | 23.79740 | 9.21969 | 1.76591 |
| d6 | 0.70258 | 8.15636 | 22.73409 |

(Values corresponding to the respective conditions)

(1)f3/f2 = 0.503
(2)fA/fT = −0.255
(3)(ra + rb)/(ra − rb) = 0.308
(4)(rc + rd)/(rc − rd) = 1.497
(5)100×S3/r3 = 0.455
(6)fB/fT = 0.224
(7)β34W = 1.350

FIGS. 6 through 8 are diagrams showing various types of aberration in the second example. FIG. 6 shows the various types of aberration at the smallest magnification state, FIG. 7 shows the various types of aberration at the intermediate magnification state, and FIG. 8 shows the various types of aberration at the largest magnification state.

In the respective aberration diagrams, h denotes an incident height, ω denotes a half angle of view, C denotes C-ray ($\lambda$=656.3 nm), D denotes d-ray ($\lambda$=587.6 nm) and F denotes F-ray ($\lambda$=486.1 nm).

In addition, in the diagrams showing astigmatism, a solid line indicates a sagital image plane while a broken line indicates a meridional image plane. Moreover, in the diagrams showing spherical aberration and the diagrams showing the astigmatism, D indicates diopter. Furthermore, the diagrams showing chromatic aberration of magnification and the diagrams showing coma aberration are shown using a unit system including degree, minute and second.

As is apparent from the respective aberration diagrams, the various types of aberration are corrected satisfactorily over the respective magnification states from the smallest magnification state to the largest magnification state in the present example.

Third Example

FIGS. 9A to 9C are developed views of an optical path of a viewfinder having a high magnification ratio according to a third example of the present invention. FIG. 9A shows a lens arrangement at the smallest magnification state; FIG. 9B shows a lens arrangement at the intermediate magnification state; and FIG. 9C shows a lens arrangement at the largest magnification state.

In FIGS. 9A to 9C, an objective lens group Go includes a first lens unit G1 composed of a double-concave lens L1 in which an eyepoint-side surface is formed to be aspherical; a second lens unit G2 composed of a double-convex lens L2 in which an object-side surface is formed to be aspherical and a double-convex lens L3; a third lens unit G3 composed of a negative meniscus lens L4 with a convex surface thereof facing the object; and a fourth lens unit G4 composed of a double-convex lens L5 in which an object-side surface is formed to be aspherical, which are arranged in that order from an object. Moreover, an eyepiece lens group Ge is composed of a double-convex lens E having an object-side surface formed to be aspherical.

Two reflecting mirrors M1 and M2 are disposed between the third lens unit G3 and the fourth lens unit G4. A reticle A as an information display portion is disposed in the vicinity of a focal point of the objective lens group Go. Moreover, a reflecting mirror M3 and a rectangular prism P are disposed between the reticle A and the eyepiece lens group Ge.

The lenses L2, L3, L5 and E are formed of a methacrylic resin. The lens L1 and the rectangular prism P are formed of an MAS resin (which is copolymer of methacryl and polystyrene). Moreover, the lens L4 is formed of polycarbonate. Furthermore, the reticle A is formed of glass. In the third example, for the purpose of correcting chromatic aberration more satisfactorily, the prism P with high dispersion which is formed of the MAP resin is disposed immediately before the eyepiece lens E and an exit surface of the prism P is formed in such a manner that the concave surface thereof faces the eyepoint.

As shown in FIGS. 9A to 9C, when the magnification is varied from the smallest magnification state to the largest magnification state, the first lens unit G1 is moved along a track which is concave toward the object in accordance with the movement of the second lens unit G2 in a direction from the eyepoint toward the object.

In this way, also in the third example, a real image of the object via the objective lens group Go is formed on the object-side surface of the reticle A. The eyepiece lens E converges light beams from the image of the object at the eyepoint E.P. Accordingly, the real image of the object can be viewed via the eyepiece lens E at the eyepoint E.P.

Values of various items in the third example of the present invention will be listed in the following table (3). In the table (3), m denotes a viewfinder magnification, X denotes diopter (unit D: diopter), 2$\omega$ denotes an angle of view, EP denotes an eyepoint, and 2H' denotes a pupil diameter. Numerals at the left end indicate the order of each lens surface from the object, r denotes a radius of curvature of each lens surface (a radius of curvature R of the standard when the lens surface is aspherical), d is a distance between lens surfaces, and n and $\nu$ indicate a refractive index and Abbe constant for d-ray ($\lambda$=587.6 nm), respectively.

TABLE 3

| | | | |
|---|---|---|---|
| m = | 0.500 tO 1.913 | | |
| X = | −1.00D | | |
| 2$\omega$ = | 54.7° to 13.3° | | |
| EP = | 15.0 | | |
| 2H' = | 4.0 | | |

| | r | d | $\nu$ | n |
|---|---|---|---|---|
| 1 | −19.6233 | 1.1000 | 33.59 | 1.571100 |
| 2* | 18.0779 | (d2 = variable) | | |
| 3* | 32.7749 | 2.2000 | 57.82 | 1.491500 |
| 4 | −55.8770 | 1.4000 | | |
| 5 | 27.1311 | 3.6000 | 57.82 | 1.491500 |
| 6 | −14.3316 | (d6 = variable) | | |
| 7 | 82.4246 | 1.1000 | 29.90 | 1.583000 |
| 8 | 16.6262 | 23.6000 | | |
| 9* | 16.0172 | 3.4000 | 57.82 | 1.491500 |
| 10 | −45.4312 | 6.2000 | | |
| 11F | ∞ | 1.0000 | 58.80 | 1.522160 |
| 12 | ∞ | 13.3000 | | |
| 13 | ∞ | 9.0000 | 33.59 | 1.571100 |
| 14 | 46.6000 | 1.0000 | | |
| 15* | 14.7500 | 3.4000 | 57.82 | 1.491500 |
| 16 | −20.9000 | 15.0000 | | |
| 17 | (eyepoint) | | | |

(Data of the aspherical surfaces)

| | $\kappa$ | $C_2$ | $C_4$ |
|---|---|---|---|
| 2nd surface | −3.7375 | 0.0 | 0.0 |
| | $C_6$ | $C_8$ | $C_{10}$ |
| | −2.0648 × 10$^{-7}$ | 2.8415 × 10$^{-9}$ | 2.7074 × 10$^{-17}$ |
| | $\kappa$ | $C_2$ | $C_4$ |
| 3rd surface | −47.4620 | 0.0 | 0.0 |
| | $C_6$ | $C_8$ | $C_{10}$ |
| | −3.9088 × 10$^{-6}$ | 8.4948 × 10$^{-8}$ | −1.2156 × 10$^{-9}$ |
| | $\kappa$ | $C_2$ | $C_4$ |
| 9th surface | −1.2000 | 0.0 | 0.0 |
| | $C_6$ | $C_8$ | $C_{10}$ |
| | 0.0 | 0.0 | 0.0 |
| | $\kappa$ | $C_2$ | $C_4$ |
| 15th surface | −1.1900 | 0.0 | 0.0 |
| | $C_6$ | $C_8$ | $C_{10}$ |
| | −6.3000 × 10$^{-7}$ | 1.4000 × 10$^{-8}$ | −1.2400 × 10$^{-10}$ |

(Variable distances when the magnification is varied)

| | smallest magnification | intermediate magnification | largest magnification |
|---|---|---|---|
| magnification | 0.50020 | 0.97826 | 1.91324 |
| d2 | 22.29995 | 8.59691 | 1.59035 |
| d6 | 0.67775 | 7.68430 | 21.38737 |

TABLE 3-continued (Values corresponding to the respective conditions)

| | |
|---|---|
| (1)f3/f2 | = 0.459 |
| (2)fA/fT | = −0.256 |
| (3)(ra + rb)/(ra − rb) | = 0.309 |
| (4)(rc + rd)/(rc − rd) | = 1.505 |
| (5)100×S3/r3 | = 0.440 |
| (6)fB/fT | = 0.226 |
| (7)β34W | = 1.350 |

FIGS. 10 through 12 are diagrams showing various types of aberration in the third example. FIG. 10 shows the various types of aberration at the smallest magnification state, FIG. 11 shows the various types of aberration at the intermediate magnification state, and FIG. 12 shows the various types of aberration at the largest magnification state.

In the respective aberration diagrams, h denotes an incident height, ω denotes a half angle of view, C denotes C-ray (λ=656.3 nm), D denotes d-ray (λ=587.6 nm) and F denotes F-ray (λ=486.1 nm).

In addition, in the diagrams showing astigmatism, a solid line indicates a sagital image plane while a broken line indicates a meridional image plane. Moreover, in the diagrams showing spherical aberration and the diagrams showing the astigmatism, D indicates diopter. Furthermore, the diagrams showing chromatic aberration of magnification and the diagrams showing coma aberration are shown using a unit system including degree, minute and second.

As is apparent from the respective aberration diagrams, the various types of aberration are corrected satisfactorily over the respective magnification states from the smallest magnification state to the largest magnification state in the present example.

Fourth Example

FIGS. 13A to 13C are developed views of an optical path of a viewfinder having a high magnification ratio according to a fourth example of the present invention. FIG. 13A shows a lens arrangement at the smallest magnification state; FIG. 13B shows a lens arrangement at the intermediate magnification state; and FIG. 13C shows a lens arrangement at the largest magnification state.

In FIGS. 13A to 13C, an objective lens group Go includes a first lens unit G1 composed of a double-concave lens L1 in which an eyepoint-side surface is formed to be aspherical; a second lens unit G2 composed of a double-convex lens L2 in which an object-side surface is formed to be aspherical and a double-convex lens L3; a third lens unit G3 composed of a negative meniscus lens L4 with a convex surface thereof facing the object; and a fourth lens unit G4 composed of a double-convex lens L5 in which an object-side surface is formed to be aspherical, which are arranged in that order from an object. Moreover, an eyepiece lens group Ge is composed of a double-convex lens E having an object-side surface formed to be aspherical.

Two reflecting mirrors M1 and M2 are disposed between the third lens unit G3 and the fourth lens unit G4. A reticle A as an information display portion is disposed in the vicinity of a focal point of the objective lens group Go. Moreover, two reflecting mirrors M3 and M4 are disposed between the reticle A and the eyepiece lens group Ge.

The lenses L2, L3, L5 and E are formed of a methacrylic resin. The lenses L1 and L4 are formed of polycarbonate in order to correct chromatic aberration. Moreover, the reticle A is formed of glass.

As shown in FIGS. 13A to 13C, when the magnification is varied from the smallest magnification state to the largest magnification state, the first lens unit G1 is moved along a track which is concave toward the object in accordance with the movement of the second lens unit G2 in a direction from the eyepoint toward the object.

In this way, also in the fourth example, a real image of the object via the objective lens group Go is formed on the object-side surface of the reticle A. The eyepiece lens E converges light beams from the image of the object at the eyepoint E.P. Accordingly, the real image of the object can be viewed via the eyepiece lens E at the eyepoint E.P.

Values of various items in the fourth example of the present invention will be listed in the following table (4). In the table (4), m denotes a viewfinder magnification, X denotes diopter (unit D: diopter), 2ω denotes an angle of view, EP denotes an eyepoint, and 2H' denotes a pupil diameter. Numerals at the left end indicate the order of each lens surface from the object, r denotes a radius of curvature of each lens surface (a radius of curvature R of the standard when the lens surface is aspherical), d is a distance between lens surfaces, and n and ν indicate a refractive index and Abbe constant for d-ray (λ=587.6 nm), respectively.

TABLE 4

| | |
|---|---|
| m = | 0.498 to 1.850 |
| X = | −1.00D |
| 2Ω = | 58.6° to 14.5° |
| EP = | 15.0 |
| 2H' = | 4.0 |

| | r | d | ν | n |
|---|---|---|---|---|
| 1 | −21.3650 | 1.2000 | 29.90 | 1.583000 |
| 2* | 19.6070 | (d2 = variable) | | |
| 3* | 44.1720 | 2.2000 | 57.07 | 1.490800 |
| 4 | −62.2400 | 1.5000 | | |
| 5 | 27.1050 | 3.8000 | 57.07 | 1.490800 |
| 6 | −14.1957 | (d6 = variable) | | |
| 7 | 84.3000 | 1.2000 | 29.90 | 1.583000 |
| 8 | 17.4300 | 25.0000 | | |
| 9* | 17.4370 | 3.4000 | 57.07 | 1.490800 |
| 10 | −44.8950 | 6.8000 | | |
| 11F | ∞ | 1.2000 | 58.80 | 1.522160 |
| 12 | ∞ | 22.0000 | | |
| 13* | 18.9000 | 3.4000 | 57.07 | 1.490800 |
| 14 | −30.3200 | 15.0000 | | |
| 15 | (eyepoint) | | | |

(Data of the aspherical surfaces)

| | κ | $C_2$ | $C_4$ |
|---|---|---|---|
| 2nd surface | −3.7800 | 0.0 | 0.0 |
| | $C_6$ | $C_8$ | $C_{10}$ |
| | $-5.4900 \times 10^{-7}$ | $1.3900 \times 10^{-8}$ | 0.0 |
| | κ | $C_2$ | $C_4$ |
| 3rd surface | −35.0000 | 0.0 | $-1.1100 \times 10^{-4}$ |
| | $C_6$ | $C_8$ | $C_{10}$ |
| | $-1.1000 \times 10^{-6}$ | $6.4400 \times 10^{-9}$ | $-1.0400 \times 10^{-10}$ |
| | κ | $C_2$ | $C_4$ |
| 9th surface | −1.3000 | 0.0 | 0.0 |
| | $C_6$ | $C_8$ | $C_{10}$ |
| | 0.0 | 0.0 | 0.0 |
| | κ | $C_2$ | $C_4$ |
| 13th surface | −1.0000 | 0.0 | 0.0 |
| | $C_6$ | $C_8$ | $C_{10}$ |
| | 0.0 | $-5.0000 \times 10^{-10}$ | 0.0 |

TABLE 4-continued (Variable distances when the magnification is varied)

|  | smallest magnification | intermediate magnification | largest magnification |
|---|---|---|---|
| magnification | 0.49780 | 0.95958 | 1.84972 |
| d2 | 23.27278 | 9.02007 | 1.62623 |
| d6 | 0.87722 | 8.06612 | 21.92378 |

(Values corresponding to the respective conditions)

| | |
|---|---|
| (1)f3/f2 | = 0.369 |
| (2)fA/fT | = −0.263 |
| (3)(ra + rb)/(ra − rb) | = 0.313 |
| (4)(rc + rd)/(rc − rd) | = 1.521 |
| (5)100×S3/r3 | = 0.350 |
| (6)fB/fT | = 0.230 |
| (7)β34W | = 1.351 |

FIGS. 14 through 16 are diagrams showing various types of aberration in the fourth example. FIG. 14 shows the various types of aberration at the smallest magnification state, FIG. 15 shows the various types of aberration at the intermediate magnification state, and FIG. 16 shows the various types of aberration at the largest magnification state.

In the respective aberration diagrams, h denotes an incident height, ω denotes a half angle of view, C denotes C-ray ($\lambda$=656.3 nm), D denotes d-ray ($\lambda$=587.6 nm) and F denotes F-ray ($\lambda$=486.1 nm).

In addition, in the diagrams showing astigmatism, a solid line indicates a sagital image plane while a broken line indicates a meridional image plane. Moreover, in the diagrams showing spherical aberration and the diagrams showing the astigmatism, D indicates diopter. Furthermore, the diagrams showing chromatic aberration of magnification and the diagrams showing coma aberration are shown using a unit system including degree, minute and second.

As is apparent from the respective aberration diagrams, the various types of aberration are corrected satisfactorily over the respective magnification states from the smallest magnification state to the largest magnification state in the present example.

Fifth Example

Figure 17B:
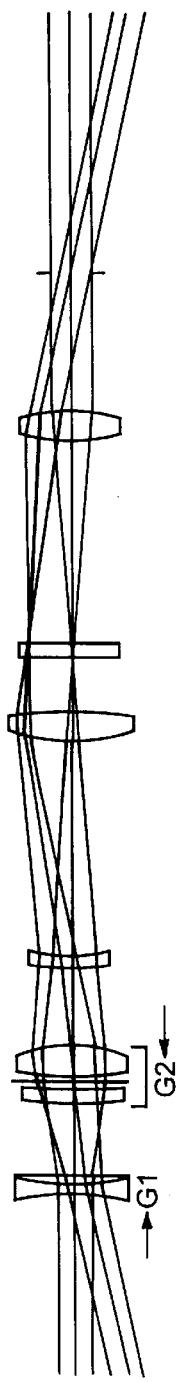
Figure 17C:
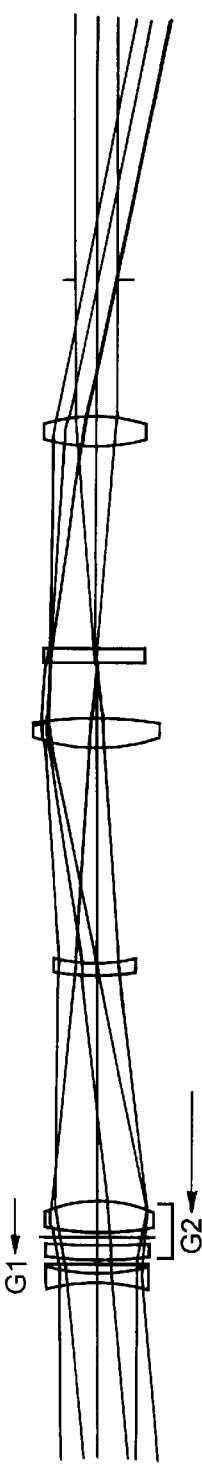

FIGS. 17A to 17C are developed views of an optical path of a viewfinder having a high magnification ratio according to a fifth example of the present invention. FIG. 17A shows a lens arrangement at the smallest magnification state; FIG. 17B shows a lens arrangement at the intermediate magnification state; and FIG. 17C shows a lens arrangement at the largest magnification state.

In FIGS. 17A to 17C, an objective lens group Go includes a first lens unit G1 composed of a double-concave lens L1 in which an eyepoint-side surface is formed to be aspherical; a second lens unit G2 composed of a positive meniscus lens L2 in which an object-side surface is formed to be aspherical and a convex surface faces the object and a double-convex lens L3; a third lens unit G3 composed of a negative meniscus lens L4 with a convex surface thereof facing the object; and a fourth lens unit G4 composed of a double-convex lens L5 in which an object-side surface is formed to be aspherical, which are arranged in that order from an object. Moreover, an eyepiece lens group Ge is composed of a double-convex lens E in which an object-side surface is formed to be aspherical.

Two reflecting mirrors M1 and M2 are disposed between the third lens unit G3 and the fourth lens unit G4. A reticle A as an information display portion is disposed in the vicinity of a focal point of the objective lens group Go. Moreover, two reflecting mirrors M3 and M4 are disposed between the reticle A and the eyepiece lens group Ge.

The lenses L2, L3, L5 and E are formed of a methacrylic resin. The lenses L1 and L4 are formed of polycarbonate in order to correct chromatic aberration. Moreover, the reticle A is formed of glass.

As shown in FIGS. 17A to 17C, when the magnification is varied from the smallest magnification state to the largest magnification state, the first lens unit G1 is moved along a track which is concave toward the object in accordance with the movement of the second lens unit G2 in a direction from the eyepoint to the object.

In this way, also in the fifth example, a real image of the object via the objective lens group Go is formed on the object-side surface of the reticle A. The eyepiece lens E converges light beams from the image of the object at the eyepoint E.P. Accordingly, the real image of the object can be viewed via the eyepiece lens E at the eyepoint E.P.

Values of various items in the fifth example of the present invention will be listed in the following table (5). In the table (5), m denotes a viewfinder magnification, X denotes diopter (unit D: diopter), 2ω denotes an angle of view, EP denotes an eyepoint, and 2H' denotes a pupil diameter. Numerals at the left end indicate the order of each lens surface from the object, r denotes a radius of curvature of each lens surface (a radius of curvature R of the standard when the lens surface is aspherical), d is a distance between lens surfaces, and n and ν indicate a refractive index and Abbe constant for d-ray ($\lambda$=587.6 nm), respectively.

TABLE 5

| | |
|---|---|
| m = | 0.436 to 1.964 |
| X = | −1.00D |
| 2Ω = | 54.6° to 11.3° |
| EP = | 15.0 |
| 2H' = | 4.0 |

| | r | d | ν | n |
|---|---|---|---|---|
| 1 | −20.4556 | 1.1000 | 29.90 | 1.583000 |
| 2* | 18.5186 | (d2 = variable) | | |
| 3* | 29.1277 | 1.6000 | 57.07 | 1.490800 |
| 4 | 123.5455 | 1.2000 | | |
| 5 | 22.6741 | 3.8000 | 57.07 | 1.490800 |
| 6 | −12.2231 | (d6 = variable) | | |
| 7 | 68.0259 | 1.1000 | 29.90 | 1.583000 |
| 8 | 15.9371 | 24.0000 | | |
| 9* | 16.8781 | 3.0000 | 57.07 | 1.490800 |
| 10 | −35.1000 | 6.2000 | | |
| 11F | ∞ | 1.2000 | 58.80 | 1.522160 |
| 12 | ∞ | 22.0000 | | |
| 13* | 18.9000 | 3.4000 | 57.07 | 1.490800 |
| 14 | −30.3200 | 15.0000 | | |
| 15 | (eyepoint) | | | |

(Data of the aspherical surfaces)

| | κ | $C_2$ | $C_4$ |
|---|---|---|---|
| 2nd surface | −4.0492 | 0.0 | 0.0 |
| | $C_6$ | $C_8$ | $C_{10}$ |
| | 0.0 | −8.3912 × $10^{-10}$ | 0.0 |
| | κ | $C_2$ | $C_4$ |
| 3rd surface | −90.0000 | 0.0 | 1.9494 × $10^{-4}$ |
| | $C_6$ | $C_8$ | $C_{10}$ |
| | −1.9184 × $10^{-5}$ | 6.6542 × $10^{-7}$ | 1.4160 × $10^{-8}$ |
| | $C_{12}$ | $C_{14}$ | |

TABLE 5-continued

|  | $0.5000 \times 10^{-10}$ κ | $0.2000 \times 10^{-11}$ $C_2$ | $C_4$ |
|---|---|---|---|
| 9th surface | −3.0000 $C_6$ | 0.0 $C_8$ | 0.0 $C_{10}$ |
|  | 0.0 κ | 0.0 $C_2$ | 0.0 $C_4$ |
| 13th surface | −1.0000 $C_6$ | 0.0 $C_8$ | 0.0 $C_{10}$ |
|  | 0.0 | $-5.0000 \times 10^{-10}$ | 0.0 |

(Variable distances when the magnification is varied)

|  | smallest magnification | intermediate magnification | largest magnification |
|---|---|---|---|
| magnification | 0.43598 | 0.92595 | 1.96400 |
| d2 | 24.94310 | 8.69553 | 1.05410 |
| d6 | 0.70446 | 8.34664 | 24.53769 |

(Values corresponding to the respective conditions)

| (1)f3/f2 | = 0.217 |
|---|---|
| (2)fA/fT | = −0.237 |
| (3)(ra + rb)/(ra − rb) | = 0.299 |
| (4)(rc + rd)/(rc − rd) | = 1.612 |
| (5)100×S3/r3 | = 0.438 |
| (6)fB/fT | = 0.207 |
| (7)β34W | = 1.352 |

FIGS. 18 through 20 are diagrams showing various types of aberration in the fifth example. FIG. 18 shows the various types of aberration at the smallest magnification state, FIG. 19 shows the various types of aberration at the intermediate magnification state, and FIG. 20 shows the various types of aberration at the largest magnification state.

In the respective aberration diagrams, h denotes an incident height, ω denotes a half angle of view, C denotes C-ray (λ=656.3 nm), D denotes d-ray (λ=587.6 nm), and F denotes F-ray (λ=486.1 nm).

In addition, in the diagrams showing astigmatism, a solid line indicates a sagital image plane while a broken line indicates a meridional image plane. Moreover, in the diagrams showing spherical aberration and the diagrams showing the astigmatism, D indicates diopter. Furthermore, the diagrams showing chromatic aberration of magnification and the diagrams showing coma aberration are shown using a unit system including degree, minute and second.

As is apparent from the respective aberration diagrams, the various types of aberration are corrected satisfactorily over the respective magnification states from the smallest magnification state to the largest magnification state in the present example.

Sixth Example

FIGS. 21A to 21C are developed views of an optical path of a viewfinder having a high magnification ratio according to a sixth example of the present invention. FIG. 21A shows a lens arrangement at the smallest magnification state; FIG. 21B shows a lens arrangement at the intermediate magnification state; and FIG. 21C shows a lens arrangement at the largest magnification state.

In FIGS. 21A to 21C, an objective lens group Go includes a first lens unit G1 composed of a double-concave lens L1 in which an eyepoint-side surface is formed to be aspherical; a second lens unit G2 composed of a positive meniscus lens L2 in which an object-side surface is formed to be aspherical and a convex surface faces the object and a double-convex lens L3; a third lens unit G3 composed of a negative meniscus lens L4 with a convex surface thereof facing the object; and a fourth lens unit G4 composed of a double-convex lens L5 in which an object-side surface is formed to be aspherical, which are arranged in that order from an object. Moreover, an eyepiece lens group Ge is composed of a double-convex lens E having an object-side surface formed to be aspherical.

Two reflecting mirrors M1 and M2 are disposed between the third lens unit G3 and the fourth lens unit G4. A reticle A as an information display portion is disposed in the vicinity of a focal point of the objective lens group Go. Moreover, two reflecting mirrors M3 and M4 are disposed between the reticle A and the eyepiece lens group Ge.

The lenses L2, L3, L5 and E are formed of a methacrylic resin. The lenses L1 and L4 are formed of polycarbonate in order to correct chromatic aberration. Moreover, the reticle A is formed of glass.

As shown in FIGS. 21A to 21C, when the magnification is varied from the smallest magnification state to the largest magnification state, the first lens unit G1 is moved along a track which is concave toward the object in accordance with the movement of the second lens unit G2 in a direction from the eyepoint to the object.

In this way, also in the sixth example, a real image of the object via the objective lens group Go is formed on the object-side surface of the reticle A. The eyepiece lens E converges light beams from the image of the object at the eyepoint E.P. Accordingly, the real image of the object can be viewed via the eyepiece lens E at the eyepoint E.P.

Values of various items in the sixth example of the present invention will be listed in the following table (6). In the table (6), m denotes a viewfinder magnification, X denotes diopter (unit D: diopter), 2ω denotes an angle of view, EP denotes an eyepoint, and 2H' denotes a pupil diameter. Numerals at the left end indicate the order of each lens surface from the object, r denotes a radius of curvature of each lens surface (a radius of curvature R of the standard when the lens surface is aspherical), d is a distance between lens surfaces, and n and v indicate a refractive index and Abbe constant for d-ray (λ=587.6 nm), respectively.

TABLE 6 m = 0.448 to 2.014
X = −1.00D
2ω = 58.8° to 12.0°
EP = 15.0
2H' = 4.0

|  | r | d | v | n |
|---|---|---|---|---|
| 1 | −19.5970 | 1.1000 | 29.90 | 1.583000 |
| 2* | 19.1020 | (d2 = variable) |  |  |
| 3* | 26.4080 | 1.4000 | 57.07 | 1.490800 |
| 4 | 79.5940 | 1.2000 |  |  |
| 5 | 23.1950 | 4.2000 | 57.07 | 1.490800 |
| 6 | −11.9087 | (d6 = variable) |  |  |
| 7 | 64.6450 | 1.1000 | 29.90 | 1.583000 |
| 8 | 15.8830 | 25.0000 |  |  |
| 9* | 18.9600 | 3.0000 | 57.07 | 1.490800 |
| 10 | −30.5030 | 6.0000 |  |  |
| 11F | ∞ | 1.2000 | 58.80 | 1.522160 |
| 12 | ∞ | 22.0000 |  |  |
| 13* | 18.9000 | 3.4000 | 57.07 | 1.490800 |
| 14 | −30.3200 | 15.0000 |  |  |
| 15 | (eyepoint) |  |  |  |

TABLE 6-continued (Data of the aspherical surfaces)

| | κ | $C_2$ | $C_4$ |
|---|---|---|---|
| 2nd surface | −3.9500 | 0.0 | 0.0 |
| | $C_6$ | $C_8$ | $C_{10}$ |
| | 0.0 | $-7.3200 \times 10^{-8}$ | 0.0 |
| | κ | $C_2$ | $C_4$ |
| 3rd surface | −70.4000 | $-7.3500 \times 10^{-4}$ | $2.2300 \times 10^{-4}$ |
| | $C_6$ | $C_8$ | $C_{10}$ |
| | $-2.1700 \times 10^{-5}$ | $9.0300 \times 10^{-7}$ | $-2.8800 \times 10^{-8}$ |
| | $C_{12}$ | $C_{14}$ | |
| | $0.5300 \times 10^{-9}$ | $-0.4400 \times 10^{-11}$ | |
| | κ | $C_2$ | $C_4$ |
| 9th surface | −3.8000 | 0.0 | 0.0 |
| | $C_6$ | $C_8$ | $C_{10}$ |
| | 0.0 | 0.0 | 0.0 |
| | κ | $C_2$ | $C_4$ |
| 13th surface | −1.0000 | 0.0 | 0.0 |
| | $C_6$ | $C_8$ | $C_{10}$ |
| | 0.0 | $-5.0000 \times 10^{-10}$ | 0.0 |

(Variable distances when the magnification is varied)

| | smallest magnification | intermediate magnification | largest magnification |
|---|---|---|---|
| magnification | 0.44762 | 0.94947 | 2.01401 |
| d2 | 25.31158 | 8.94245 | 1.22546 |
| d6 | 0.68843 | 8.40542 | 24.77454 |

(Values corresponding to the respective conditions)

(1) f3/f2 = 0.197
(2) fA/fT = −0.237
(3) (ra + rb)/(ra − rb) = 0.322
(4) (rc + rd)/(rc − rd) = 1.651
(5) 100 × S3/r3 = 0.448
(6) fB/fT = 0.211
(7) β34W = 1.393

FIGS. 22 through 24 are diagrams showing various types of aberration in the sixth example. FIG. 22 shows the various types of aberration at the smallest magnification state, FIG. 23 shows the various types of aberration at the intermediate magnification state, and FIG. 24 shows the various types of aberration at the largest magnification state.

In the respective aberration diagrams, h denotes an incident height, ω denotes a half angle of view, C denotes C-ray (λ=656.3 nm), D denotes d-ray (λ=587.6 nm), and F denotes F-ray (λ=486.1 nm).

In addition, in the diagrams showing astigmatism, a solid line indicates a sagital image plane while a broken line indicates a meridional image plane. Moreover, in the diagrams showing spherical aberration and the diagrams showing the astigmatism, D indicates diopter. Furthermore, the diagrams showing chromatic aberration of magnification and the diagrams showing coma aberration are shown using a unit system including degree, minute and second.

As is apparent from the respective aberration diagrams, the various types of aberration are corrected satisfactorily over the respective magnification states from the smallest magnification state to the largest magnification state in the present example.

Seventh Example

FIGS. 25A to 25C are developed views of an optical path of a viewfinder having a high magnification ratio according to a seventh example of the present invention. FIG. 25A shows a lens arrangement at the smallest magnification state; FIG. 25B shows a lens arrangement at the intermediate magnification state; and FIG. 25C shows a lens arrangement at the largest magnification state.

In FIGS. 25A to 25C, an objective lens group Go includes a first lens unit G1 composed of a double-concave lens L1 in which an eyepoint-side surface is formed to be aspherical; a second lens unit G2 composed of a positive meniscus lens L2 in which an object-side surface is formed to be aspherical and a convex surface faces the object and a double-convex lens L3; a third lens unit G3 composed of a negative meniscus lens L4 with a convex surface thereof facing the object; and a fourth lens unit G4 composed of a double-convex lens L5 in which an object-side surface is formed to be aspherical, which are arranged in that order from an object. Moreover, an eyepiece lens group Ge is composed of a double-convex lens E having an object-side surface formed to be aspherical.

Two reflecting mirrors M1 and M2 are disposed between the third lens unit G3 and the fourth lens unit G4. A reticle A as an information display portion is disposed in the vicinity of a focal point of the objective lens group Go. Moreover, two reflecting mirrors M3 and M4 are disposed between the reticle A and the eyepiece lens group Ge.

The lenses L2, L3, L5 and E are formed of a methacrylic resin. The lenses L1 and L4 are formed of polycarbonate in order to correct chromatic aberration. Moreover, the reticle A is formed of glass.

As shown in FIGS. 25A to 25C, when the magnification is varied from the smallest magnification state to the largest magnification state, the third lens unit G3 is moved along a track which is convex toward the object in accordance with the movement of the second lens unit G2 in a direction from the eyepoint to the object.

In this way, also in the seventh example, a real image of the object via the objective lens group Go is formed on the object-side surface of the reticle A. The eyepiece lens E converges light beams from the image of the object at the eyepoint E.P. Accordingly, the real image of the object can be viewed via the eyepiece lens E at the eyepoint E.P.

Values of various items in the seventh example of the present invention will be listed in the following table (7). In the table (7), m denotes a viewfinder magnification, X denotes diopter (unit D: diopter), 2ω denotes an angle of view, EP denotes an eyepoint, and 2H' denotes a pupil diameter. Numerals at the left end indicate the order of each lens surface from the object, r denotes a radius of curvature of each lens surface (a radius of curvature R of the standard when the lens surface is aspherical), d denotes a distance between lens surfaces, and n and ν indicate a refractive index and Abbe constant for d-ray (λ=587.6 nm), respectively.

TABLE 7 m = 0.448 to 2.014
X = −1.00D
2ω = 58.0° to 11.9°
EP = 15.0
2H' = 4.0

| | r | d | ν | n |
|---|---|---|---|---|
| 1 | −19.8300 | 1.1000 | 29.90 | 1.583000 |
| 2* | 18.8830 | (d2 = variable) | | |
| 3* | 26.6000 | 1.4000 | 57.07 | 1.490800 |
| 4 | 78.1740 | 1.2000 | | |
| 5 | 23.2740 | 4.2000 | 57.07 | 1.490800 |
| 6 | −11.9087 | (d6 = variable) | | |
| 7 | 69.6150 | 1.1000 | 29.90 | 1.583000 |
| 8 | 16.1130 | (d8 = variable) | | |
| 9* | 19.0140 | 3.4000 | 57.07 | 1.490800 |
| 10 | −30.3200 | 6.0000 | | |

TABLE 7-continued

| | | | | |
|---|---|---|---|---|
| 11F | ∞ | 1.2000 | 58.80 | 1.522160 |
| 12 | ∞ | 22.0000 | | |
| 13* | 18.9000 | 3.4000 | 57.07 | 1.490800 |
| 14 | −30.3200 | 15.0000 | | |
| 15 | (eyepoint) | | | |

(Data of the aspherical surfaces)

| | $\kappa$ | $C_2$ | $C_4$ |
|---|---|---|---|
| 2nd surface | −3.9800 | 0.0 | 0.0 |
| | $C_6$ | $C_8$ | $C_{10}$ |
| | 0.0 | $-4.2850 \times 10^{-9}$ | 0.0 |
| | $\kappa$ | $C_2$ | $C_4$ |
| 3rd surface | −71.9300 | $-7.3500 \times 10^{-4}$ | $2.1940 \times 10^{-4}$ |
| | $C_6$ | $C_8$ | $C_{10}$ |
| | $-2.1560 \times 10^{-5}$ | $9.0310 \times 10^{-7}$ | $-2.8780 \times 10^{-8}$ |
| | $C_{12}$ | $C_{14}$ | |
| | $0.5300 \times 10^{-9}$ | $-0.4400 \times 10^{-11}$ | |
| | $\kappa$ | $C_2$ | $C_4$ |
| 9th surface | −3.8000 | 0.0 | 0.0 |
| | $C_6$ | $C_8$ | $C_{10}$ |
| | 0.0 | 0.0 | 0.0 |
| | $\kappa$ | $C_2$ | $C_4$ |
| 13th surface | −1.0000 | 0.0 | 0.0 |
| | $C_6$ | $C_8$ | $C_{10}$ |
| | 0.0 | $-5.0000 \times 10^{-10}$ | 0.0 |

(Variable distances when the magnification is varied)

| | smallest magnification | intermediate magnification | largest magnification |
|---|---|---|---|
| magnification | 0.44765 | 0.94941 | 2.01360 |
| d2 | 25.47181 | 11.21118 | 1.30146 |
| d6 | 0.72819 | 4.25913 | 24.89850 |
| d8 | 25.00000 | 35.72969 | 25.00004 |

(Values corresponding to the respective conditions)

(1) f3/f2 = 0.193
(2) fA/fT = −0.235
(3) (ra + rb)/(ra − rb) = 0.323
(4) (rc + rd)/(rc − rd) = 1.602
(5) 100 × S3/r3 = 0.446
(6) fB/fT = 0.210
(7) β34W = 1.393

FIGS. 26 through 28 are diagrams showing various types of aberration in the seventh example. FIG. 26 shows the various types of aberration at the smallest magnification state, FIG. 27 shows the various types of aberration at the intermediate magnification state, and FIG. 28 shows the various types of aberration at the largest magnification state.

In the respective aberration diagrams, h denotes an incident height, ω denotes a half angle of view, C denotes C-ray (λ=656.3 nm), D denotes d-ray (λ=587.6 nm), and F denotes F-ray (λ=486.1 nm).

In addition, in the diagrams showing astigmatism, a solid line indicates a sagital image plane while a broken line indicates a meridional image plane. Moreover, in the diagrams showing spherical aberration and the diagrams showing the astigmatism, D indicates diopter. Furthermore, the diagrams showing chromatic aberration of magnification and the diagrams showing coma aberration are shown using a unit system including degree, minute and second.

As is apparent from the respective aberration diagrams, the various types of aberration are corrected satisfactorily over the respective magnification states from the smallest magnification state to the largest magnification state in the present example.

As is described above, in the respective examples, although the structure is compact and the moving amounts of each lens group is small, various types of aberration are corrected satisfactorily while securing a high magnification ratio of four or more.

Moreover, in the above-mentioned examples, there exists a relatively large space before and after the reticle, and a space for escape has a large margin. Therefore, it is easy to alternately switch between, for example, a standard mode and a panorama mode by changing the field frame.

Furthermore, since a reticle having a planar-plate shape is provided independently of lenses in the above-mentioned examples, correction of parallax or the like can be electrically conducted with ease by configuring the reticle using a liquid crystal device or the like.

In addition, the 1–2 units moving technique is used in the first to sixth examples, and the 2–3 units moving technique is used in the seventh example. However, it is possible to select either of the 1–2 units moving technique or the 2–3 units moving technique in any example. Furthermore, magnification can be varied by moving the first lens unit G1, the second lens unit G2, and the third lens unit G3 independently of one another.

As described above, according to the present invention, a viewfinder which has a high magnification ratio of four times or more and in which aberration correction can be satisfactorily conducted can be realized in spite of its compact and simple structure.

While the invention has been described by way of exemplary embodiments, it is to be understood that there are many changes and substitutions which may be made without departing from the spirit and the scope of the invention, which is defined by the appended claims.

I claim:

1. A viewfinder having a high magnification ratio comprising, in order from an object:

an objective lens group having positive refractive power;

an information display portion, disposed in a vicinity of a focal point of the objective lens group, for displaying information about photography; and an eyepiece lens group having positive refractive power for viewing an image of the object formed via the objective lens group;

wherein the objective lens group includes a first lens unit G1 having negative refractive power, a second lens unit G2 having positive refractive power, and a third lens unit G3 having negative refractive power which are arranged in that order from the object, the second lens unit G2 being moved along an optical axis so that magnification of the viewfinder is varied, wherein the first lens unit G1 includes at least one negative lens L1, the second lens unit G2 includes at least two positive lenses L2, L3 arranged in order from the object, the third lens unit G3 includes at least one negative lens L4, and the positive lens L2 of the second lens unit G2 is formed so that an object-side surface thereof has an aspherical shape, and wherein the following condition is satisfied:

$0.15 < f3/f2 < 0.6$ where a focal length of the positive lens L2 of the second lens unit G2 is f2, and a focal length of the positive lens L3 of the second lens unit G2 is f3.

2. A viewfinder having a high magnification ratio according to claim 1, wherein the following condition is satisfied:

$-0.3 < fA/fT < -0.2$ where a focal length of the first lens unit G1 is fA, and a composite focal length of the first lens unit G1 through the third lens unit G3 at a largest magnification state is fT.

3. A viewfinder having a high magnification ratio according to claim 1, wherein the following conditions are satisfied:

$$0.2<(ra+rb)/(ra-rb)<0.34$$

$$1.3<(rc+rd)/(rc-rd)<2.0$$

where a radius of curvature of an object-side surface of the positive lens L3 is ra, a radius of curvature of an eyepoint-side surface of the positive lens L3 is rb, a radius of curvature of an object-side surface of the at least one negative lens L4 of the third lens unit G3 is rc, and a radius of curvature of an eyepoint-side of the at least one negative lens L4 of the third lens unit G3 is rd.

4. A viewfinder having a high magnification ratio according to claim 1, wherein the following condition is satisfied:

$$0.46<100\times S3/r3<0.3$$

where a paraxial radius of curvature of the object-side surface of the positive lens L2 is r3, and a distance along the optical axis between a position on the object-side surface of the positive lens L2 which is away from the optical axis in a direction perpendicular to the optical axis by r3/10 and a position on the object-side surface of the positive lens L2 which is positioned on the optical axis is S3.

5. A viewfinder having a high magnification ratio according to claim 1, wherein the following condition is satisfied:

$$0.2<fB/fT<0.3$$

where a focal length of the second lens unit G2 is fB, and composite focal length of the first lens unit G1 through the third lens unit G3 at a largest magnification state is fT.

6. A viewfinder having a high magnification ratio according to claim 1, wherein the objective lens group includes a fourth lens unit G4 which is disposed on an eyepoint-side of the third lens unit G3 and which has positive refractive power, and wherein the following condition is satisfied:

$$1.3<\beta 34W<1.5$$

where a composite magnification of the third lens unit G3 and the fourth lens unit G4 at a smallest magnification state is β34W.

7. A viewfinder having a high magnification ratio according to claim 2, wherein the following conditions are satisfied:

$$0.2<(ra+rb)/(ra-rb)<0.34$$

$$1.3<(rc+rd)/(rc-rd)<2.0$$

where a radius of curvature of an object-side surface of the positive lens L3 is ra, a radius of curvature of an eyepoint-side surface of the positive lens L3 is rb, a radius of curvature of an object-side surface of the at least one negative lens L4 of the third lens unit G3 is rc, and a radius of curvature of an eyepoint-side of the at least one negative lens L4 of the third lens unit G4 is rd.

8. A viewfinder having a high magnification ratio according to claim 2, wherein the following condition is satisfied:

$$0.46<100\times S3/r3<0.3$$

where a paraxial radius of curvature of the object-side surface of the positive lens L2 is r3, and a distance along the optical axis between a position on the object-side surface of the positive lens L2 which is away from the optical axis in a direction perpendicular to the optical axis by r3/10 and a position on the object-side surface of the positive lens L2 which is positioned on the optical axis is S3.

9. A viewfinder having a high magnification ratio according to claim 3, wherein the following condition is satisfied:

$$0.46<100\times S3/r3<0.3$$

where a paraxial radius of curvature of the object-side surface of the positive lens L2 is r3, and a distance along the optical axis between a position on the object-side surface of the positive lens L2 which is away from the optical axis in a direction perpendicular to the optical axis by r3/10 and a position on the object-side surface of the positive lens L2 which is positioned on the optical axis is S3.

10. A viewfinder having a high magnification ratio according to claim 7, wherein the following condition is satisfied:

$$0.46<100\times S3/r3<0.3$$

where a paraxial radius of curvature of the object-side surface of the positive lens L2 is r3, and a distance along the optical axis between a position on the object-side surface of the positive lens L2 which is away from the optical axis in a direction perpendicular to the optical axis by r3/10 and a position on the object-side surface of the positive lens L2 which is positioned on the optical axis is S3.

11. A viewfinder having a high magnification ratio according to claim 2, wherein the following condition is satisfied:

$$0.2<fB/fT<0.3$$

where a focal length of the second lens unit G2 is fB, and composite focal length of the first lens unit G1 through the third lens unit G3 at a largest magnification state is fT.

12. A viewfinder having a high magnification ratio according to claim 3, wherein the following condition is satisfied:

$$0.2<fB/fT<0.3$$

where a focal length of the second lens unit G2 is fB, and composite focal length of the first lens unit G1 through the third lens unit G3 at a largest magnification state is fT.

13. A viewfinder having a high magnification ratio according to claim 4, wherein the following condition is satisfied:

$$0.2<fB/fT<0.3$$

where a focal length of the second lens unit G2 is fB, and composite focal length of the first lens unit G1 through the third lens unit G3 at a largest magnification state is fT.

14. A viewfinder having a high magnification ratio according to claim 7, wherein the following condition is satisfied:

$$0.2<fB/fT<0.3$$

where a focal length of the second lens unit G2 is fB, and composite focal length of the first lens unit G1 through the third lens unit G3 at a largest magnification state is fT.

15. A viewfinder having a high magnification ratio according to claim 8, wherein the following condition is satisfied:

$$0.2 < fB/fT < 0.3$$

where a focal length of the second lens unit G2 is fB, and composite focal length of the first lens unit G1 through the third lens unit G3 at a largest magnification state is fT.

16. A viewfinder having a high magnification ratio according to claim 9, wherein the following condition is satisfied:

$$0.2 < fB/fT < 0.3$$

where a focal length of the second lens unit G2 is fB, and composite focal length of the first lens unit G1 through the third lens unit G3 at a largest magnification state is fT.

17. A viewfinder having a high magnification ratio according to claim 2, wherein the objective lens group includes a fourth lens unit G4 which is disposed on an eyepoint-side of the third lens unit G3 and which has positive refractive power, and wherein the following condition is satisfied:

$$1.3 < \beta 34W < 1.5$$

where a composite magnification of the third lens unit G3 and the fourth lens unit G4 at a smallest magnification state is β34W.

18. A viewfinder having a high magnification ratio according to claim 3, wherein the objective lens group includes a fourth lens unit G4 which is disposed on an eyepoint-side of the third lens unit G3 and which has positive refractive power, and wherein the following condition is satisfied:

$$1.3 < \beta 34W < 1.5$$

where a composite magnification of the third lens unit G3 and the fourth lens unit G4 at a smallest magnification state is β34W.

19. A viewfinder having a high magnification ratio according to claim 4, wherein the objective lens group includes a fourth lens unit G4 which is disposed on an eyepoint-side of the third lens unit G3 and which has positive refractive power, and wherein the following condition is satisfied:

$$1.3 < \beta 34W < 1.5$$

where a composite magnification of the third lens unit G3 and the fourth lens unit G4 at a smallest magnification state is β34W.

20. A viewfinder having a high magnification ratio according to claim 5, wherein the objective lens group includes a fourth lens unit G4 which is disposed on an eyepoint-side of the third lens unit G3 and which has positive refractive power, and wherein the following condition is satisfied:

$$1.3 < \beta 34W < 1.5$$

where a composite magnification of the third lens unit G3 and the fourth lens unit G4 at a smallest magnification state is β34W.

* * * * *